(12) United States Patent
Hedloy

(10) Patent No.: US 8,306,993 B2
(45) Date of Patent: *Nov. 6, 2012

(54) METHOD, SYSTEM AND COMPUTER READABLE MEDIUM FOR ADDRESSING HANDLING FROM AN OPERATING SYSTEM

(75) Inventor: Atle Hedloy, Madrid (ES)

(73) Assignee: Arendi S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 11/745,186

(22) Filed: May 7, 2007

(65) Prior Publication Data

US 2007/0244907 A1 Oct. 18, 2007
US 2010/0211600 A2 Aug. 19, 2010

Related U.S. Application Data

(63) Continuation of application No. 09/390,303, filed on Sep. 3, 1999, now Pat. No. 7,272,604.

(30) Foreign Application Priority Data

Sep. 3, 1998 (NO) ........................................ 984066

(51) Int. Cl.
*G06F 17/30* (2006.01)
(52) U.S. Cl. ........................................ 707/769; 707/767
(58) Field of Classification Search .................. 707/767, 707/769
See application file for complete search history.

(56) References Cited

U.S. PATENT DOCUMENTS

| | | | |
|---|---|---|---|
| 3,350,695 A | 10/1967 | Kaufman et al. | 340/172.5 |
| 4,270,182 A | 5/1981 | Asija | 364/900 |
| 4,453,217 A | 6/1984 | Boivie | 364/300 |
| 4,674,065 A | 6/1987 | Lange et al. | |
| 4,969,097 A | 11/1990 | Levin | 364/419 |
| 4,972,349 A | 11/1990 | Kleinberger | 364/900 |
| 5,226,117 A | 7/1993 | Miklos | 395/157 |
| 5,267,155 A | 11/1993 | Buchanan et al. | 364/419.14 |

(Continued)

FOREIGN PATENT DOCUMENTS

EP 0 093 250 A2 11/1983

(Continued)

OTHER PUBLICATIONS

PD Turney—National Research Council, Institute for Information. Learning to Extract Keyphrses from Text. Feb. 1999.*

(Continued)

*Primary Examiner* — Khanh Pham
(74) *Attorney, Agent, or Firm* — Sunstein Kann Murphy & Timbers LLP

(57) ABSTRACT

A method, system and computer readable medium for information handling within an operating system, including providing a record retrieval program; providing an input device within a window or screen of the operating system and configured to enter an execute command which initiates a record retrieval from local and remote information sources using the record retrieval program; using the record retrieval program to enter first information into search fields provided in the record retrieval program; entering the execute command using the input device after the step of entering the first information; searching, using the record retrieval program, the local and remote information sources for second information associated with the first information; and displaying the second information in the record retrieval program, when one of the local and remote information sources includes second information associated with the first information.

30 Claims, 17 Drawing Sheets

U.S. PATENT DOCUMENTS

| | | | |
|---|---|---|---|
| 5,331,555 A | 7/1994 | Hashimoto et al. | 364/419.07 |
| 5,355,472 A | 10/1994 | Lewis | 395/600 |
| 5,375,200 A | 12/1994 | Dugan et al. | 395/159 |
| 5,388,150 A | 2/1995 | Schneyer et al. | 379/67 |
| 5,392,386 A | 2/1995 | Chalas | |
| 5,416,901 A | 5/1995 | Torres | 395/159 |
| 5,491,783 A | 2/1996 | Douglas et al. | 395/159 |
| 5,491,784 A | 2/1996 | Douglas et al. | 395/159 |
| 5,491,785 A | 2/1996 | Robson et al. | 395/162 |
| 5,493,105 A | 2/1996 | Desai | 235/375 |
| 5,495,565 A | 2/1996 | Millard et al. | 395/146 |
| 5,500,859 A | 3/1996 | Sharma et al. | 370/81 |
| 5,530,853 A | 6/1996 | Schell et al. | 395/600 |
| 5,546,447 A | 8/1996 | Skarbo et al. | 379/142 |
| 5,566,330 A | 10/1996 | Sheffield | 395/600 |
| 5,576,955 A | 11/1996 | Newbold et al. | |
| 5,579,467 A | 11/1996 | Capps | 395/768 |
| 5,587,911 A | 12/1996 | Asano et al. | 364/444.2 |
| 5,606,712 A | 2/1997 | Hidaka | 395/800 |
| 5,623,652 A * | 4/1997 | Vora et al. | 707/10 |
| 5,628,004 A | 5/1997 | Gormley et al. | 395/615 |
| 5,634,121 A | 5/1997 | Tracz et al. | 395/602 |
| 5,640,565 A | 6/1997 | Dickinson | 395/683 |
| 5,666,502 A | 9/1997 | Capps | 345/352 |
| 5,696,962 A * | 12/1997 | Kupiec | 707/4 |
| 5,708,804 A | 1/1998 | Goodwin et al. | 395/603 |
| 5,724,597 A | 3/1998 | Cuthbertson et al. | |
| 5,732,229 A | 3/1998 | Dickinson | |
| 5,732,395 A | 3/1998 | Silverman | 704/260 |
| 5,734,871 A | 3/1998 | Kleinerman et al. | 395/500 |
| 5,737,726 A | 4/1998 | Cameron et al. | 705/7 |
| 5,740,433 A * | 4/1998 | Carr et al. | 707/202 |
| 5,742,905 A | 4/1998 | Pepe et al. | 455/461 |
| 5,754,636 A | 5/1998 | Bayless et al. | 379/142 |
| 5,761,656 A | 6/1998 | Ben-Shachar | |
| 5,761,663 A | 6/1998 | Lagarde et al. | 707/10 |
| 5,774,887 A | 6/1998 | Wolff et al. | 707/1 |
| 5,778,367 A | 7/1998 | Wesinger et al. | 707/10 |
| 5,781,189 A | 7/1998 | Holleran et al. | 345/335 |
| 5,787,451 A | 7/1998 | Mogilevsky | 707/533 |
| 5,793,972 A | 8/1998 | Shane | 395/200.49 |
| 5,794,228 A | 8/1998 | French et al. | |
| 5,794,259 A | 8/1998 | Kikinis | 707/507 |
| 5,799,302 A | 8/1998 | Johnson et al. | |
| 5,805,810 A | 9/1998 | Maxwell | 395/200.36 |
| 5,805,886 A | 9/1998 | Skarbo et al. | 395/685 |
| 5,805,911 A | 9/1998 | Miller | 395/796 |
| 5,815,830 A | 9/1998 | Anthony | |
| 5,819,273 A * | 10/1998 | Vora et al. | 707/10 |
| 5,826,257 A | 10/1998 | Snelling, Jr. | 707/4 |
| 5,835,089 A | 11/1998 | Skarbo et al. | 345/335 |
| 5,859,636 A | 1/1999 | Pandit | |
| 5,860,073 A | 1/1999 | Ferrel et al. | 715/255 |
| 5,864,848 A | 1/1999 | Horvitz et al. | |
| 5,873,107 A | 2/1999 | Borovoy et al. | |
| 5,873,108 A | 2/1999 | Goyal et al. | 707/507 |
| 5,884,309 A | 3/1999 | Vanechanos, Jr. | 707/10 |
| 5,893,093 A | 4/1999 | Wills | 707/5 |
| 5,896,321 A * | 4/1999 | Miller et al. | 365/189.15 |
| 5,896,533 A | 4/1999 | Ramos et al. | 395/680 |
| 5,907,838 A | 5/1999 | Miyasaka et al. | 707/4 |
| 5,913,214 A | 6/1999 | Madnick et al. | 707/10 |
| 5,923,848 A | 7/1999 | Goodhand et al. | 395/200.49 |
| 5,924,074 A | 7/1999 | Evans | |
| 5,924,090 A | 7/1999 | Krellenstein | 707/5 |
| 5,926,808 A | 7/1999 | Evans et al. | 707/3 |
| 5,930,471 A | 7/1999 | Milewski et al. | 395/200.04 |
| 5,930,764 A | 7/1999 | Melchione et al. | 705/10 |
| 5,940,484 A | 8/1999 | DeFazio et al. | 379/142 |
| 5,946,647 A | 8/1999 | Miller et al. | |
| 5,946,679 A | 8/1999 | Ahuja et al. | 707/3 |
| 5,999,938 A | 12/1999 | Bliss et al. | |
| 6,006,218 A | 12/1999 | Breese et al. | |
| 6,006,351 A | 12/1999 | Peretz et al. | 714/751 |
| 6,012,075 A | 1/2000 | Fein et al. | 707/540 |
| 6,018,571 A | 1/2000 | Langlois et al. | 379/207 |
| 6,021,403 A | 2/2000 | Horvitx et al. | |
| 6,021,412 A * | 2/2000 | Ho et al. | 707/104.1 |
| 6,026,398 A | 2/2000 | Brown et al. | |
| 6,026,410 A | 2/2000 | Allen et al. | 707/104 |
| 6,028,605 A * | 2/2000 | Conrad et al. | 715/840 |
| 6,055,531 A * | 4/2000 | Bennett et al. | 707/5 |
| 6,065,012 A * | 5/2000 | Balsara et al. | 707/102 |
| 6,067,565 A | 5/2000 | Horvitz | |
| 6,073,138 A * | 6/2000 | de l'Etraz et al. | 707/104.1 |
| 6,081,788 A | 6/2000 | Appleman et al. | 705/14 |
| 6,085,201 A | 7/2000 | Tso | |
| 6,085,226 A | 7/2000 | Horvitz | |
| 6,092,074 A | 7/2000 | Rodkin et al. | 707/102 |
| 6,108,686 A * | 8/2000 | Williams, Jr. | 709/202 |
| 6,151,584 A | 11/2000 | Papierniak et al. | 705/10 |
| 6,178,411 B1* | 1/2001 | Reiter | 705/408 |
| 6,182,133 B1 | 1/2001 | Horvitz | |
| 6,189,026 B1 | 2/2001 | Birrell et al. | 709/206 |
| 6,192,380 B1 | 2/2001 | Light et al. | 707/505 |
| 6,208,975 B1 | 3/2001 | Bull et al. | 705/14 |
| 6,209,005 B1 | 3/2001 | Harker et al. | 707/501 |
| 6,223,570 B1 | 5/2001 | Horvitz et al. | |
| 6,247,029 B1 | 6/2001 | Kelley et al. | 707/507 |
| 6,253,188 B1 | 6/2001 | Witek et al. | 705/14 |
| 6,260,035 B1 | 7/2001 | Horvitz et al. | |
| 6,262,730 B1 | 7/2001 | Horvitz et al. | |
| 6,285,987 B1 | 9/2001 | Roth et al. | 705/27 |
| 6,304,881 B1* | 10/2001 | Halim et al. | 707/201 |
| 6,317,761 B1 | 11/2001 | Landsman et al. | 707/513 |
| 6,323,853 B1 | 11/2001 | Hedloy | |
| 6,349,299 B1* | 2/2002 | Spencer et al. | 707/702 |
| 6,373,940 B2 | 4/2002 | Shaffer et al. | 379/355.02 |
| 6,377,965 B1* | 4/2002 | Hachamovitch et al. | 715/203 |
| 6,381,593 B1* | 4/2002 | Yano et al. | 707/3 |
| 6,385,592 B1 | 5/2002 | Angles et al. | 705/14 |
| 6,388,957 B2 | 5/2002 | Yankowski | |
| 6,405,206 B1* | 6/2002 | Kayahara | 707/102 |
| 6,421,691 B1 | 7/2002 | Nishiyama et al. | 707/507 |
| 6,421,693 B1 | 7/2002 | Nishiyama et al. | 707/507 |
| 6,442,540 B2* | 8/2002 | Sako et al. | 707/3 |
| 6,499,021 B1 | 12/2002 | Abu-Hakima | 706/10 |
| 6,523,022 B1* | 2/2003 | Hobbs | 707/3 |
| 6,651,217 B1 | 11/2003 | Kennedy et al. | 715/255 |
| 6,711,585 B1* | 3/2004 | Copperman et al. | 707/104.1 |
| 6,725,227 B1* | 4/2004 | Li | 707/102 |
| 6,738,615 B1 | 5/2004 | Chow et al. | 455/415 |
| 6,782,510 B1 | 8/2004 | Gross et al. | 715/533 |
| 6,826,407 B1 | 11/2004 | Helferich | 455/466 |
| 6,870,828 B1* | 3/2005 | Giordano, III | 370/352 |
| 7,039,599 B2 | 5/2006 | Merriman et al. | 705/14 |
| 7,051,019 B1 | 5/2006 | Land et al. | |
| 7,136,853 B1 | 11/2006 | Kohda et al. | 707/6 |
| 7,149,761 B2* | 12/2006 | Cooke et al. | 707/203 |
| 7,155,451 B1 | 12/2006 | Torres | 707/104.1 |
| 7,216,292 B1 | 5/2007 | Snapper et al. | 715/507 |
| 7,272,604 B1 | 9/2007 | Hedloy | 707/10 |
| 7,353,246 B1* | 4/2008 | Rosen et al. | 709/202 |
| 7,496,854 B2 | 2/2009 | Hedloy | 715/780 |
| 7,505,974 B2 | 3/2009 | Gropper | 707/10 |
| 7,509,349 B2 | 3/2009 | Celik | 707/200 |
| 7,917,843 B2 | 3/2011 | Hedloy | 715/230 |
| 7,921,356 B2 | 4/2011 | Hedloy | 715/230 |
| 2002/0078030 A1* | 6/2002 | Iwayama et al. | 707/1 |
| 2002/0188683 A1 | 12/2002 | Lytle et al. | 709/206 |
| 2003/0033288 A1 | 2/2003 | Shanahan et al. | 707/3 |
| 2003/0084074 A1* | 5/2003 | Balogh et al. | 707/201 |
| 2003/0167279 A1* | 9/2003 | Smiga et al. | 707/102 |
| 2006/0047644 A1 | 3/2006 | Bocking et al. | 707/4 |
| 2008/0313159 A1 | 12/2008 | Hedloy | 707/3 |
| 2010/0281354 A1 | 11/2010 | Hedloy | 715/220 |
| 2011/0072029 A1 | 3/2011 | Hedloy | 707/758 |

FOREIGN PATENT DOCUMENTS

| | | |
|---|---|---|
| EP | 0520926 | 12/1992 |
| EP | 1630642 A1 | 1/2006 |
| GB | 2196454 A | 4/1988 |
| GB | 2 318 703 | 4/1998 |
| JP | 08116362 | 5/1996 |
| WO | WO 97/21183 | 6/1997 |

| | | |
|---|---|---|
| WO | WO 98/16890 | 4/1998 |
| WO | WO 98/19259 | 5/1998 |
| WO | WO 98/34391 | 8/1998 |

OTHER PUBLICATIONS

Steve Hitchcock et al. Towards universal linking for electronic jounrnals. Pub. 1998.*
Adressing the Issues, Jun. 24, 1993.
Philip Robinson, The Envelope, Please: It's AddressMate, San Jose Mercury News, Sunday, Jul. 19, 1992.
Steve Supkoff, AddressMate, PCM, Aug. 1992.
L.R. Shannon, Addressing Envelopes, The New York Times, Tuesday, Jul. 14, 1992.
Rob Schwabach, Addressing for Success, On Computers column, Mar. 16, 1992.
Infoworld, p. 15, Mar. 16, 1992.
Colvin's beta-testing of Addressmate sparks developer's appreciation, Westview, Apr. 6, 1992.
Press Release:AddressMate Software Automatically Addresses and bar Codes Envelopes to Save Time and money, Mar. 9, 1992.
Gearoge M> Long, Letter to Mr. David Block, Nov. 11, 1994.
Philip J. Damiano, Letter to Mr. David Block, Jan. 5, 1994.
Ed Kahn, Envelope Addressing Finally Simplifieed AddressMate Does Addressing and Much More, Microtimes, Nov. 27, 1995.
Kirsten Bernthal, LabelWriter XL Plus, PC Catalog, Aug. 18, 1995.
David Plotkin, Address for Success, Bay Area Computer Currents, p. 36-38, Mar. 21, 1995.
Getting Results with Microsoft Office for Windows 95, Version 7.0, 1995.
Getting Results with Microsoft Office 97, copyright 1995-1997.
Microsoft Word, User's Guide, Version 6.0, copyright 1993-1994.
Apple Internet Address Detectors User's Manual, copyright 1997.
Eve Wilson, Links and Structures in Hypertext Databases for Law, in Hypertext: Concepts, Systems and Applications, Proceedings of the First European Conference opn Hypertext, Nov. 1990.
Eve Wilson, Guiding Lawyers: Mapping Law into Hypertext, Artificial Intelligence Review 6, pp. 161-189, 1992.
Charles H. Franke III et al, Authoring a Hypertext Unix Help Manual, 1995.
P.J. Brown, Guide User Manual, 1985, sixteenth impression, Apr. 1995.
E. Wilson, Cases for Justus: Preparing a Case Database for a Hypertext Information Retrieval System, Literary and Linguistic Computing, vol. 5, No. 2, 1990.
Mike Langberg, Apple Breaks New Ground by Displaying What on its drawing board, Aug. 7, 1996.
E. Wilson, Integrated Information Retrieval for Law in a Hypertext Environment, Annual ACM Conference on Research and Development in information Retrieval, 1988.
Multimedia Hyperlinks Automatically Created for Reference Documents, Research Disclosure, Jun. 1993.
Joy-Lyn Blak, WikiWikiWeb, Computer World, Jan. 29, 2001.
Apple Introduces Internet Address Detectors, Press Release, Sep. 7, 1997.
Cara Cunningham, Apple Kicks Off Macworld with talk of revival, new software demos, InfoWorld Electric, Aug. 7, 1996.
James Staten, Apple Looks to the Future, MacWeek, Aug. 7, 1996.
Mark Simmons, Striking a Key Note, Mac Addict Online, Aug. 8, 1996.
Jim Miller, email regarding Apple Data Detectors, Jan. 8, 1997.
Apple Data Detectors web page, Jan. 6, 1997.
Apple Data Detectors—Now Shipping web page, Jan. 6, 1997.
The Apple Data Detectors FAQ, Jan. 6, 1997.
Developer's Guide to Apple Data Detectors, Dec. 1, 1997.
AppleScript Editors, Utilities & Environments, available at www.applescriptsourcebook.com/links/applescripteditors.html, dated Jan. 11, 2004.
Steve Tannehill, News from Jul. 1997.
Trial Transcript for C.A. No. 02-343T, *Arendi USA, Inc. et al.* vs. *Microsoft Corporationm et al.*, Sep. 27, 2004.
Excerpt from Jury Charge Transcript for C.A. No. 02-343T, *Arendi USA, Inc. et al.* vs. *Microsoft Corporationm et al.*, Sep. 28, 2004.

Apple Data Detectors 1.0.2, TidBITS #419, Mar. 9, 1998.
Tonya Engst, More Context on Contextual menus, TidBITS #399, Sep. 29, 1997.
Tonya Engst, Of Mice and Menus, TidBITS #398, Sep. 22, 1997.
Charles Whaley, Will this be enough to kick-start Apple?, Computing Canada, Aug. 4, 1997.
A Farewell to the Apple Advanced Technology Group, SIGCHI, vol. 30, No. 2, Apr. 1998.
James R. Miller and Thomas Bonura, From Documents to Objects, in SiGCHI, vol. 30, No. 2, Apr. 1998.
Thomas Bonura and James R. Miller, Drop Zones, in SIGCHI, vol. 30, No. 2, Apr. 1998.
Bonnie A. Nardi, et al., Collaborative, Programmable Intelligent Agents, Communications of the ACM, vol. 41, No. 3, Mar. 1998.
Trial Transcript for C.A. No. 02-343T, *Arendi USA, Inc. et al.* vs. *Microsoft Corporationm et al.*, Sep. 13, 2004.
Trial Transcript for C.A. No. 02-343T, *Arendi USA, Inc. et al.* vs. *Microsoft Corporationm et al.*, Sep. 14, 2004.
Trial Transcript for C.A. No. 02-343T, *Arendi USA, Inc. et al.* vs. *Microsoft Corporationm et al.*, Sep. 15, 2004.
Trial Transcript for C.A. No. 02-343T, *Arendi USA, Inc. et al.* vs. *Microsoft Corporationm et al.*, Sep. 16, 2004.
Trial Transcript for C.A. No. 02-343T, *Arendi USA, Inc. et al.* vs. *Microsoft Corporationm et al.*, Sep. 17, 2004.
Trial Transcript for C.A. No. 02-343T, *Arendi USA, Inc. et al.* vs. *Microsoft Corporationm et al.*, Sep. 20, 2004.
Trial.Transcript for C.A. No. 02-343T, *Arendi USA, Inc. et al.* vs. *Microsoft Corporationm et al.*, Sep. 21, 2004.
Trial Transcript for C.A. No. 02-343T, *Arendi USA, Inc. et al.* vs. *Microsoft Corporationm et al.*, Sep. 22, 2004.
Contextual Menu Manager/Apple Data Detectors (MS 049590-MS 049594), posted 2002 printed Jan. 2004.
CoStar User Manual for AddressMate and AddressMate Plus, 1995.
ctags (UNIX Command), 1993.
Microsoft Word 6.0, for Windows and Macintosh, 1993.
N.D. Beitner, et al, Multimedia Support and Authoring in Microcosm: an extended model, 1994.
Spell, iSpell Spellout, 1993.
SED(1), BSD Reference Manual Page, 1993.
AddressMate for Windows, Version 2.0, Product Box and License Agreement, 1992.
Important Note for New AddressMate Users, 1995.
Important Tips for LabelWriter Owners Using AddressMate, 1993.
AddressMate Advertisement "Whye Do it the Olde Way", 1995.
Ken Hart, Simplify Envelope Printing with AddressMate, Computer Shopper, 1995.
AddressMate for Windows, Advertisements, 1995-1996.
AddressMate Plus, Advertisement, 1995-1996.
Address Fixer for Microsoft Word and office, Product Box, 1996.
AddressMate Plus, Product Box and License Agreement, 1995.
CTAGS(1) Manual Page, 1993.
Matt Bernstein, An Apprentice that Discovers Hypertext Links, 1992.
Contextual Menu Manager/Apple Data Detectors, posted 2002 printed Jan. 2004.
P.J. Brown et al, A Help System Based on UNIX Man Pages, 1987.
John Robertson, et al, The Hypermedia Authoring Research Toolkit, ECHT 194 proceedings, pp. 177-185, 1994.
What is Wiki and Wiki History webpages, available at wiki.org/wiki.cgi?WhatIsWiki and www.c2.org/cgi/wiki?WikiHistory, last edited Jun. 2002 printed on Aug. 2003.
Wiki Wiki Origin, last edited Jun. 2003 printed on Aug. 2003.
Microsoft's Supplemental Responses to Arendi's Interrogatories, in *Arendi U.S.A. et al v. Microsoft Corporation*, Civil Action 02-CV-343 (ECT) from United States District Court for the District of Rhode Islands, 2004.
Apple Data Detector WebPages, available on web.archive.org/web/20020601164217/www.apple.com/applescript/data_detectors, first established in 1997—last edited 2002.
Apple Data Detectors 1.0.2 Read Me, 1998.
eMailman Internet Address Detectors, 1996-2000.
Control-Click! The Archive, 1997-2000.
Contextual Menus: One of System 8's Greatest Features, in ApplePress, posted 2002.

Contextual Menu Manager/Apple Data Detectors, available at web.archive.org/web/20020803063750/www.macemail.com/emailer/CEMH/contextual.shtml, posted 2002.

Trygve's CMM Plug-Ins Homer, available at web.archive.org/web/19980130053511/www.bombaydigital.com/cmms, 1997.

ADD Depot, available from web.archive.org/web/20000819091818/http://homepage.mac.com/mathewmiller/add, posted 2000.

MacOS8.com—Mac OS 8 Indepth, 1999.

Microsoft Corporation and Dell Inc.'s Answer, Affirmative Defenses and Counterclaims to Complaint, *Arendi Holding Ltd.* v. *Microsoft Corp. et al.*, C.A. No. 09-119-JJf, from the United States District Court for the District of Delaware, pp. 1-17, Apr. 30, 2009.

"More about the Database," http://c2.com/cgi/wiki?MoreAbout-TheDatabase, pp. 1-3, last edited May 7, 2009.

"Ward Cunningham," http://c2.com/cgi/wiki?WardCunningham, pp. 1-15, last edited Apr. 23, 2009.

"Adding New Pages," http://c2.com/cgi/wiki?AddingNewPages, pp. 1-2, last edited Jun. 8, 2009.

"WikiWikiWeb," http://c2.com/cgi/wiki?WikiWikiWeb, 1 page, last edited Jun. 1, 2009.

"Apple Data Detectors User's Manual," 16 pages, last updated Jul. 31, 1997.

"ISPELL (1)," 15 pages, Aug. 23, 2003.

"International Ispell," http://fmg-www.cs.ucla.edu/geoff/ispell.html, 5 pages, Aug. 23, 2003.

"ISPELL," http:theochem.ki.ku.dk/on_line_docs/ispell/ispell_1.html, 4 pages, Aug. 23, 2003.

"Getting Results with Microsoft Office 97" Microsoft, 701 pages, 1995-97.

Tom Quinlan, "Apple System Software Branches Out," 3 pages, Mar. 16, 1992.

"Introducing AddressMate Plus, The Address Book Manager for Microsoft Word," 4 pages, May 1996.

"AddressMate for Windows, New Version 2.0," 9 pages, Oct. 9, 1994. Mar. 1996 Reviews, http://www.techweb.com/winmag/library/1996/0396/03rvh002.htm 9 pages, Jan. 26, 2004.

"ISPELL (1)" 16 pages, Aug. 23, 2003.

"ISPELL (4)," 11 pages, Aug. 23, 2003.

"Corel Professional Office 7 Quick Results," 534 pages, no date available.

"Getting Results with Microsoft Office for Windows 95," Microsoft, 636 pages, 1995.

User Manual, "For AddressMate and AddressMate Plus," CoStar, 212 pages, 1994-1995.

"Addressing the Issues," AdressMate Software, 4 pages, Jun. 24, 1993.

L. R. Shannon, "Peripherals," *The New York Times*, 1 page, Jul. 14, 1992.

"AddressMate Software Automatically Addresses and Bar Codes Envelopes to Save Time and Money," AddressMate, 3 pages, Mar. 9, 1992.

"AddressMate for Windows, Adds all the missing pieces to your word processor," 6 pages, no date available.

"LabelWriter XL Plus," 18 PC Catalog, 1 page, Aug. 18, 1995.

"AddressMate Plus," CoStar, 16 pages, no date available.

"AddressMate Incorporates Correction Capability," *Law Technology*, 3 pages, Jan. 1996.

"User's Guide for Windows 16-Bit, Version 5.2," Novell, Inc., GroupWise, 235 pages, 1993-1997.

"User's Guide for Windows, 32-Bit" Novell, Inc., GroupWise, 322 pages, 1998.

"GroupWise Webaccess User's Guide," Novell, Inc., 37 pages, 1998.

Opposition against European Patent EP 1 171 836, Letter to the European Patent Office in Preparation for the Oral Proceedings scheduled for May 26, 2009, 31 pages, Mar. 26, 2009.

Opposition against European Patent EP 1 171 836, Auxillary Request 1 Claims, 3 pages, Mar. 26, 2009.

Opposition against European Patent EP 1 171 836, Auxillary Request 2 Claims, 3 pages, Mar. 26, 2009.

Opposition against European Patent EP 1 171 836, Auxillary Request 3 Claims, 3 pages, Mar. 26, 2009.

Opposition against European Patent EP 1 171 836, Auxillary Request 4 Claims, 3 pages, Mar. 26, 2009.

Opposition against European Patent EP 1 171 836, Auxillary Request 5 Claims, 3 pages, Mar. 26, 2009.

Opposition against European Patent EP 1 171 836, Auxillary Request 6 Claims, 3 pages, Mar. 26, 2009.

Opposition against European Patent EP 1 171 836, Auxillary Request 7 Claims, 3 pages, Mar. 26, 2009.

Opposition against European Patent EP 1 171 836, Auxillary Request 8 Claims, 3 pages, Mar. 26, 2009.

Opposition against European Patent EP 1 171 836, Auxillary Request 9 Claims, 3 pages, Mar. 26, 2009.

Opposition against European Patent EP 1 171 836, Auxillary Request 10 Claims, 3 pages, Mar. 26, 2009.

Opposition against European Patent EP 1 171 836, Auxillary Request 11 Claims, 3 pages, Mar. 26, 2009.

Opposition against European Patent EP 1 171 836, Auxillary Request 12 Claims, 3 pages, Mar. 26, 2009

Opposition against European Patent EP 1 171 836, Auxillary Request 13 Claims, 3 pages, Mar. 26, 2009.

Opposition against European Patent EP 1 171 836, Auxillary Request 14 Claims, 3 pp., Mar. 26, 2009.

Opposition against European Patent EP 1 171 836, Auxillary Request 15 Claims, 3 pages, Mar. 26, 2009.

Opposition against European Patent EP 1 171 836, Auxillary Request 16 Claims, 3 pages, Mar. 26, 2009.

Expert Report of Professor Benjamin Goldberg, 43 pages, dated Mar. 10, 2008.

Supplemental Expert Report of Professor Benjamin Goldberg, 15 pages, May 6, 2008.

Second Supplemental Expert Report of Professor Benjamin Goldberg, 32 pages, Mar. 26, 2009.

Expert Report of Professor Calvin Gidney III, 3 pages, Mar. 26, 2009.

European Patent Office, Summons to Attend Oral Proceedings pursuant to Rule 115(1) EPC, 18 pages, Jan. 23, 2009.

Affidavit of James Miller, 18 pages, Jul. 19, 2006.

Affidavit of David Block, 23 pages, Jul. 21, 2006.

Order Re Claim Construction, in *Arendi U.S.A. Inc. et al.* v. *Microsoft Corp.*, CA No. 02-343-T, from United States District Court for the District of Rhode Island, 4 pages, Sep. 27, 2004.

Expert Report of W. Bruce Croft, PH.D., in *Arendi U.S.A., Inc. et al.* v. *Microsoft Corp.*, CA No. 02-CV-343 (ECT), from United States District Court for the District of Rhode Island, 66 pages, Mar. 1, 2004.

Supplemental Expert Report of W. Bruce Croft, PH.D., in *Arendi U.S.A., Inc. et al.* v. *Microsoft Corp.*, CA No. 02-CV-343 (ECT), from United States District Court for the District of Rhode Island, 42 pages, Jun. 9, 2004.

Microsoft Word 97 Help File entitled "Automatically check spelling and grammar as you type," 1 page, no date available.

Microsoft Word 97 Help File entitled "Turn automatic changes on or off," 1 page, no date available.

Microsoft Word 97 Help File entitled "Automatically Correct Text," 1 page, no date available.

Microsoft Word 97 Help File entitled "Field Codes: Hyperlink Field," 1 page, no date available.

Microsoft Word 97 Help File entitled "Change the Contents of an AutoCorrect Entry," 1 page, no date available.

"User Manual For AddressMate and AddressMate Plus," AddressMate Software, 218 pages, 1994-1995.

Affirming Claim Construction Order, in *Arendi USA et al.* v. *Microsoft Corp.*, No. 05-1170, 05-1171, from Court of Appeals for the Federal Circuit, 1 page, Feb. 8, 2006.

Miller, Jim, "Portfolio; Innovative Interfaces for Information Management," Website: http://www.miramontes.com/portfolio/add/add1.html, 1 page, no date available.

Church, Kenneth et al., "Commercial Applications of Natural Language Processing," 30 pages, Mar. 13, 2003.

Yankelovich, Nichole et al., "Intermedia: The concept and the Construction of a Seamless Information Environment," *Electronic Publishing Technologies*, pp. 81-96, Jan. 1988.

Utting, Kenneth et al., "Context and Orientation in Hypermedia Networks," *AMC Transactions on Information Systems*, vol. 7, No. 1, pp. 58-84, Jan. 1989.

Kahn, Paul, "Linking Together Books: Experiments in Adapting Published Material into Intermedia Documents," *Hypermedia*, vol. 1 No. 2, pp. 1-37, 1989.

Combs, James, "Hypertext, Full-Text and Automatic Linking," pp. 83-98, 1990.

Catlin, Karen Smith et al., "Hypermedia Templates: An Authors Tools," *Hypertext 1991 Proceedings*, pp. 147-160, Dec. 1991.

Meyrowitz, Norman, "The Missing Link, Why We're All Doing Hypertext Wrong," *The Society of Text, Hypertext, Hypermedia, and the Social Construction of Information*, pp. 107-114, no date available.

Halasz, Frank, "Reflections on Notecards: Seven Issues for the Next Generation of Hypermedia Systems," *Hypertext 87 Papers*, pp. 345-365, Nov. 1987.

Haan, Bernard et al., "IRIS Hypermedia Services," pp. 36-51, Jan. 1992.

McKnight, Dillon, "Review, The Textbook of the Future," *Hypertext: a Psychological Perspective*, pp. 19-51, 8 pages, Mar. 1993.

Bouvin, Niels Olof, "Augmenting the Web Through Open Hypermedia," 95 pages, Nov. 2000.

Halasz, Frank et al., "The Dexter Hypertext Reference Model," pp. 95-133, Dec. 7, 1989.

Weinreich, Harald et al., "The Look of the Link—Concepts for the User Interface of Extended Hyperlinks," 10 pages, no date available.

Fountain, Andrew et al., "Microcosm: An Open Model for Hypermedia with Dynamic Linking," *Hypertext: Concept Systems and Applications, Proceedings of the First European Conference on Hypertext*, France, 16 pages, Nov. 1990.

Justus: Wilson, Eve, "Cases for Justus: Preparing a Case Database for a Hypertext Information Retrieval System," *Library and Linguistics Computing*, vol. 5, No. 2, pp. 119-128, 1990.

"Claris Em@iler Getting Started," Claris Corporation, 57 pages, 1995.

"OmniPage Pro for Windows 95," Version 7.0 Caere Corporation, 57 pages, 1996.

Microsoft Corporation and Dell Inc.'s Invalidity Contentions, in *Arendi Holding Ltd. v. Microsoft Corp*, CA No. 09-119-JJF, from United States District Court for the District of Delaware, pp. 1-26, Aug. 14, 2009.

Exhibit A, in *Arendi Holding Ltd. v. Microsoft Corp*, CA No. 09-119-JJF, from United States District Court for the District of Delaware, pp. 1-35, Aug. 14, 2009.

Exhibit AA, in *Arendi Holding Ltd. v. Microsoft Corp*, CA No. 09-119-JJF, from United States District Court for the District of Delaware, pp. 1-28, Aug. 14, 2009.

Exhibit AAA, in *Arendi Holding Ltd. v. Microsoft Corp*, CA No. 09-119-JJF, from United States District Court for the District of Delaware, pp. 1-33, Aug. 14, 2009.

Exhibit B, in *Arendi Holding Ltd. v. Microsoft Corp*, CA No. 09-119-JJF, from United States District Court for the District of Delaware, pp. 1-33, Aug. 14, 2009.

Exhibit BB, in *Arendi Holding Ltd. v. Microsoft Corp*, CA No. 09-119-JJF, from United States District Court for the District of Delaware, pp. 1-36, Aug. 14, 2009.

Exhibit C, in *Arendi Holding Ltd. v. Microsoft Corp*, CA No. 09-119-JJF, from United States District Court for the District of Delaware, pp. 1-34, Aug. 14, 2009.

Exhibit CC, in *Arendi Holding Ltd. v. Microsoft Corp*, CA No. 09-119-JJF, from United States District Court for the District of Delaware, pp. 1-32, Aug. 14, 2009.

Exhibit D, in *Arendi Holding Ltd. v. Microsoft Corp*, CA No. 09-119-JJF, from United States District Court for the District of Delaware, pp. 1-32, Aug. 14, 2009.

Exhibit DD, in *Arendi Holding Ltd. v. Microsoft Corp*, CA No. 09-119-JJF, from United States District Court for the District of Delaware, pp. 1-22, Aug. 14, 2009.

Exhibit E, in *Arendi Holding Ltd. v. Microsoft Corp*, CA No. 09-119-JJF, from United States District Court for the District of Delaware, pp. 1-33, Aug. 14, 2009.

Exhibit EE, in *Arendi Holding Ltd. v. Microsoft Corp*, CA No. 09-119-JJF, from United States District Court for the District of Delaware, pp. 1-23, Aug. 14, 2009.

Exhibit F, in *Arendi Holding Ltd. v. Microsoft Corp*, CA No. 09-119-JJF, from United States District Court for the District of Delaware, pp. 1-33, Aug. 14, 2009.

Exhibit FF, in *Arendi Holding Ltd. v. Microsoft Corp*, CA No. 09-119-JJF, from United States District Court for the District of Delaware, pp. 1-40, Aug. 14, 2009.

Exhibit G, in *Arendi Holding Ltd. v. Microsoft Corp*, CA No. 09-119-JJF, from United States District Court for the District of Delaware, pp. 1-33, Aug. 14, 2009.

Exhibit GG, in *Arendi Holding Ltd. v. Microsoft Corp*, CA No. 09-119-JJF, from United States District Court for the District of Delaware, pp. 1-32, Aug. 14, 2009.

Exhibit H, in *Arendi Holding Ltd. v. Microsoft Corp*, CA No. 09-119-JJF, from United States District Court for the District of Delaware, pp. 1-33, Aug. 14, 2009.

Exhibit HH, in *Arendi Holding Ltd. v. Microsoft Corp*, CA No. 09-119-JJF, from United States District Court for the District of Delaware, pp. 1-32, Aug. 14, 2009.

Exhibit I-1 through I-6, in *Arendi Holding Ltd. v. Microsoft Corp*, CA No. 09-119-JJF, from United States District Court for the District of Delaware, pp. 1-1800, Aug. 14, 2009.

Exhibit II, in *Arendi Holding Ltd. v. Microsoft Corp*, CA No. 09-119-JJF, from United States District Court for the District of Delaware, pp. 1-34, Aug. 14, 2009.

Exhibit J, in *Arendi Holding Ltd. v. Microsoft Corp*, CA No. 09-119-JJF, from United States District Court for the District of Delaware, pp. 1-89, Aug. 14, 2009.

Exhibit JJ, in *Arendi Holding Ltd. v. Microsoft Corp*, CA No. 09-119-JJF, from United States District Court for the District of Delaware, pp. 1-35, Aug. 14, 2009.

Exhibit K, in *Arendi Holding Ltd. v. Microsoft Corp*, CA No. 09-119-JJF, from United States District Court for the District of Delaware, pp. 1-260, Aug. 14, 2009.

Exhibit KK, in *Arendi Holding Ltd. v. Microsoft Corp*, CA No. 09-119-JJF, from United States District Court for the District of Delaware, pp. 1-34, Aug. 14, 2009.

Exhibit L, in *Arendi Holding Ltd. v. Microsoft Corp*, CA No. 09-119-JJF, from United States District Court for the District of Delaware, pp. 1-190, Aug. 14, 2009.

Exhibit LL, in *Arendi Holding Ltd. v. Microsoft Corp*, CA No. 09-119-JJF, from United States District Court for the District of Delaware, pp. 1-33, Aug. 14, 2009.

Exhibit M, in *Arendi Holding Ltd. v. Microsoft Corp*, CA No. 09-119-JJF, from United States District Court for the District of Delaware, pp. 1-58, Aug. 14, 2009.

Exhibit MM, in *Arendi Holding Ltd. v. Microsoft Corp*, CA No. 09-119-JJF, from United States District Court for the District of Delaware, pp. 1-29, Aug. 14, 2009.

Exhibit N, in *Arendi Holding Ltd. v. Microsoft Corp*, CA No. 09-119-JJF, from United States District Court for the District of Delaware, pp. 1-47, Aug. 14, 2009.

Exhibit NN, in *Arendi Holding Ltd. v. Microsoft Corp*, CA No. 09-119-JJF, from United States District Court for the District of Delaware, pp. 1-30, Aug. 14, 2009.

Exhibit O, in *Arendi Holding Ltd. v. Microsoft Corp*, CA No. 09-119-JJF, from United States District Court for the District of Delaware, pp. 1-51, Aug. 14, 2009.

Exhibit OO, in *Arendi Holding Ltd. v. Microsoft Corp*, CA No. 09-119-JJF, from United States District Court for the District of Delaware, pp. 1-29, Aug. 14, 2009.

Exhibit P, *Arendi Holding Ltd. v. Microsoft Corp*, CA No. 09-119-JJF, from United States District Court for the District of Delaware, pp. 1-133, Aug. 14, 2009.

Exhibit PP, *Arendi Holding Ltd. v. Microsoft Corp*, CA No. 09-119-JJF, from United States District Court for the District of Delaware, pp. 1-22, Aug. 14, 2009.

Exhibit Q *Arendi Holding Ltd. v. Microsoft Corp*, CA No. 09-119-JJF, from United States District Court for the District of Delaware, pp. 1-40, Aug. 14, 2009.

Exhibit QQ, *Arendi Holding Ltd. v. Microsoft Corp*, CA No. 09-119-JJF, from United States District Court for the District of Delaware, pp. 1-52, Aug. 14, 2009.

Exhibit R, *Arendi Holding Ltd.* v. *Microsoft Corp*, CA No. 09-119-JJF, from United States District Court for the District of Delaware, pp. 1-44, Aug. 14, 2009.
Exhibit RR, *Arendi Holding Ltd.* v. *Microsoft Corp*, CA No. 09-119-JJF, from United States District Court for the District of Delaware, pp. 1-32, Aug. 14, 2009.
Exhibit S, *Arendi Holding Ltd.* v. *Microsoft Corp*, CA No. 09-119-JJF, from United States District Court for the District of Delaware, pp. 1-51, Aug. 14, 2009.
Exhibit SS, *Arendi Holding Ltd.* v. *Microsoft Corp*, CA No. 09-119-JJF, from United States District Court for the District of Delaware, pp. 1-34, Aug. 14, 2009.
Exhibit T, *Arendi Holding Ltd.* v. *Microsoft Corp*, CA No. 09-119-JJF, from United States District Court for the District of Delaware, pp. 1-34, Aug. 14, 2009.
Exhibit TT, *Arendi Holding Ltd.* v. *Microsoft Corp*, CA No. 09-119-JJF, from United States District Court for the District of Delaware, pp. 1-32, Aug. 14, 2009.
Exhibit U, *Arendi Holding Ltd.* v. *Microsoft Corp*, CA No. 09-119-JJF, from United States District Court for the District of Delaware, pp. 1-34, Aug. 14, 2009.
Exhibit UU, *Arendi Holding Ltd.* v. *Microsoft Corp*, CA No. 09-119-JJF, from United States District Court for the District of Delaware, pp. 1-32, Aug. 14, 2009.
Exhibit V, *Arendi Holding Ltd.* v. *Microsoft Corp*, CA No. 09-119-JJF, from United States District Court for the District of Delaware, pp. 1-34, Aug. 14, 2009.
Exhibit VV, *Arendi Holding Ltd.* v. *Microsoft Corp*, CA No. 09-119-JJF, from United States District Court for the District of Delaware, pp. 1-33, Aug. 14, 2009.
Exhibit W, *Arendi Holding Ltd.* v. *Microsoft Corp*, CA No. 09-119-JJF, from United States District Court for the District of Delaware, pp. 1-35, Aug. 14, 2009.
Exhibit WW, *Arendi Holding Ltd.* v. *Microsoft Corp*, CA No. 09-119-JJF, from United States District Court for the District of Delaware, pp. 1-32, Aug. 14, 2009.
Exhibit X, *Arendi Holding Ltd.* v. *Microsoft Corp*, CA No. 09-119-JJF, from United States District Court for the District of Delaware, pp. 1-7, Aug. 14, 2009.
Exhibit XX, *Arendi Holding Ltd.* v. *Microsoft Corp*, CA No. 09-119-JJF, from United States District Court for the District of Delaware, pp. 1-31, Aug. 14, 2009.
Exhibit Y, *Arendi Holding Ltd.* v. *Microsoft Corp*, CA No. 09-119-JJF, from United States District Court for the District of Delaware, pp. 1-34, Aug. 14, 2009.
Exhibit YY, *Arendi Holding Ltd.* v. *Microsoft Corp*, CA No. 09-119-JJF, from United States District Court for the District of Delaware, pp. 1-31, Aug. 14, 2009.
Exhibit Z, *Arendi Holding Ltd.* v. *Microsoft Corp*, CA No. 09-119-JJF, from United States District Court for the District of Delaware, pp. 1-34, Aug. 14, 2009.
Exhibit ZZ, *Arendi Holding Ltd.* v. *Microsoft Corp*, CA No. 09-119-JJF, from United States District Court for the District of Delaware, pp. 1-32, Aug. 14, 2009.
Defendants Microsoft Corp. And Dell, Inc.'s Brief in Support of their Motion for Summary Judgment of Invalidity for Failure to Comply with 35 U.S.C. § 112, *Arendi Holding Ltd.* v. *Microsoft Corp*, CA No. 09-119-JJF, from United States District Court for the District of Delaware, pp. 1-23, Aug. 10, 2009.
Declaration of W. Bruce Croft, Ph.D., *Arendi Holding Ltd.* v. *Microsoft Corp*, CA No. 09-119-JJF, from United States District Court for the District of Delaware, pp. 1-15, Aug. 10, 2009.
Plaintiff's Opening Brief in Support of Its Proposed Claim Constructions, *Arendi Holding Ltd.* v. *Microsoft Corp*, CA No. 09-119-JJF, from United States District Court for the District of Delaware, pp. 1-36, Aug. 10, 2009.
Microsoft Corp. and Dell Inc.'s Claim Construction Brief, *Arendi Holding Ltd.* v. *Microsoft Corp*, CA No. 09-119-JJF, from United States District Court for the District of Delaware, pp. 1-28, Aug. 10, 2009.
Plaintiff's Counter-Statement of Disputed Material Facts in Opposition to Defendants' Motion for Summary Judgment of Invalidity, *Arendi Holding Ltd.* v. *Microsoft Corp*, CA No. 09-119-JJF, from United States District Court for the District of Delaware, pp. 1-19, Aug. 24, 2009.
Plaintiff's Answering Brief in Support of its Proposed Claim Constructions, *Arendi Holding Ltd.* v. *Microsoft Corp*, CA No. 09-119-JJF, from United States District Court for the District of Delaware, pp. 1-43, Aug. 25, 2009.
Microsoft Corp. and Dell, Inc.'s Answering Claim Construction Brief, *Arendi Holding Ltd.* v. *Microsoft Corp*, CA No. 09-119-JJF, from United States District Court for the District of Delaware, pp. 1-25, Aug. 25, 2009.
Microsoft Corp. and Dell, Inc.'s Response to Plaintiff's Counter-Statement to Defendants' Motion for Summary Judgment of Invalidity, *Arendi Holding Ltd.* v. *Microsoft Corp*, CA No. 09-119-JJF, from United States District Court for the District of Delaware, pp. 1-22, Aug. 31, 2009.
Microsoft Corp. and Dell, Inc.'s First Amended Answer, Affirmative Defenses and Counterclaims to Complaint, *Arendi Holding Ltd.* v. *Microsoft Corp*, CA No. 09-119-JJF, from United States District Court for the District of Delaware, pp. 1-34, Oct. 19, 2009.
Plaintiff's Answer to Defendants' First Amended Counterclaims, *Arendi Holding Ltd.* v. *Microsoft Corp*, CA No. 09-119-JJF, from United States District Court for the District of Delaware, pp. 1-19, Oct. 30, 2009.
Microsoft Corp. and Dell, Inc.'s Second Amended Answer, Affirmative Defenses and Counterclaims to Complaint, *Arendi Holding Ltd.* v. *Microsoft Corp*, CA No. 09-119-JJF, from United States District Court for the District of Delaware, pp. 1-34, Dec. 8, 2009.
Decision Revoking European Patent No. EP-B-1171836, European Patent Office, pp. 1-13, Jul. 9, 2009.
Notice of Appeal for European Patent No. EP-B-1171836, in the European Patent Office, pp. 1-2, Nov. 1, 2009.
Grounds of Appeal for European Patent No. EP-B-1171836, in the European Patent Office, pp. 1-62, Nov. 19, 2009.
Submission of opponent (Microsoft) in opposition against European Patent No. 1 171 836, Appeal T1779/09-3501, in the European Patent Office, 32 pages, Mar. 25, 2010.
Second Affidavit of David Block, 15 pages, May 15, 2009.
Second Affidavit of James Miller, 36 pages, May 15, 2009.
Hall, Wendy, et al., "Rethinking Hypermedia," Kluwer Academic Publishers, 87 pages, 1996.
Deposition of David Block, *Arendi U.S.A., Inc.* v. *Microsoft Corp.*, Case No. 02-CV-343 (ECT), from United States District Court for the Northern District of California, 196 pages, Aug. 13, 2004.
Exhibits for the Deposition of David Block, *Arendi U.S.A., Inc.* v. *Microsoft Corp.*, Case No. 02-CV-343 (ECT), from United States District Court for the Northern District of California, 334 pages, Aug. 13, 2004.
Writ of Summons to Arendi Holding Co., District Court in the Hague and English translation, 65 pages, Oct. 26, 2005.
Microsoft's Reply in the Main Action, Defense in the Counterclaim, District Court in the Hague, No. 2006/0782, 55 pages, date unknown.
Microsoft's Reply in the Main Action, Defense in the Counterclaim, District Court in the Hague, No. 2006/0782, English Translation, 51 pages, date unknown.
Microsoft's Reply in Counterclaim for Infringement, District Court in the Hague, No. 2006/0782, 26 pages, Sep. 24, 2008.
Microsoft's Reply in Counterclaim for Infringement, District Court in the Hague, No. 2006/0782, English Translation, 26 pages, Sep. 24, 2008.
Statement of Defense in the Principal Action and With Regard to the Interlocutory Claim Also Comprising A Counterclaim, With Exhibit, District Court in the Hague, No. 2006/0782, 57 pages, Jan. 31, 2007.
Statement of Defense in the Principal Action and With Regard to the Interlocutory Claim Also Comprising a Counterclaim, District Court in the Hague, No. 2006/0782, English Translation, 23 pages, Jan. 31, 2007.
Statement of Rejoinder in the Principal Action (Incl. With Regard to the Interlocutory Claims) Also Comprising Statement of Reply in the Counterclaim With Exhibits, District Court in the Hague, No. 2006/0782, 123 pages, Mar. 12, 2008.
Statement of Rejoinder in the Principal Action (Incl. With Regard to the Interlocutory Claims) Also Comprising Statement of Reply in the Counterclaim, District Court in the Hague, No. 2006/0782, English Translation, 33 pages, Mar. 12, 2008.
Letter from Abraham H. Spierer to David Block, Dec. 19, 1994.
Claris Em@iler User's Manual, 187 pages, 1995-1997.
"Word Lookup Data Detectors," Dictionary.com, available at http://dictionary.reference.com/mac/add.html, 3 pages, Jan. 12, 2004.
Apple.com internet web pages (marked "MS 118139-MS 118143"), 5 pages, Dec. 7, 2001.
"Overview: What are Apple Data Detectors", Apple.com internet web pages (marked "MA 118078-MS 118092"), 15 pages, Jun. 1, 2002.
Addressmate Plus User Manual Addendum, 2 pages, Nov. 1, 1995.
Now Software, Inc., "Now Contact & Up•to•Date Quick Reference Guide", 18 pages, 1992-95.
Now Software, Inc., "Now Contact version 3.5 User's Guide", 229 pages, 1992-95.
Now Software, Inc., "Now Up•to•Date version 3.5 User's Guide", 232 pages, 1992-95.
Now Software, Inc., "Now Utilities Quick Reference Guide", (6 pages), 1992-1995.
Now Software, Inc., "What's New in Now Up•to•Date & Now Contact", 14 pages, 1995.
Microsoft's Supplemental Response to Arendi's Interrogatory No. 5, United States District Court for the District of Rhode Island, 4 pages, Apr. 7, 2003.
Microsoft's Supplemental Response to Arendi's Second and Thrid Sets of Interrogatories (Nos. 10,12), United States District Court for the District of Rhode Island, 22 pages, Sep. 8, 2003.
Reply Brief of Plaintiffs-Appellants Arendi Usa, Inc. and Arendi Holding Limited, United States Court of Appeals for the Federal Circuit, 37 pages, Sep. 2, 2005.
Apple Data Detectors/Internet Address Detectors, ADD-IAD_1.0. 2_Info.txt, 1 page, Mar. 5, 1998.
Cortinas, M., Data Ratchet extracts info, ZD.com, 2 pages, Apr. 3, 1997.
Glucose Unveils Data Ratchet v.1.1!, Glucose Development Corp., 4 pages, 1997.
Glucose Releases Data Ratchet Source, Glucose Press Release, 1 page, Dec. 18, 1999.
Are you a document mechanic?, from Glucose Development Corp.'s webpage (http://glulabs.com), 2 pages, 2002.
Glucose Open Source Tools, from Glucose Development Corp., 2 pages, 1999.
E-Mail 'Net Differences—Eudora Pro and E-Mail Connection shine in their own ways . . . , Communications Week, 4 pages, Jan. 6, 1997.
Internet Update Sep. 10, 1997, Newsbytes news Network, 5 pages, Sep. 10, 1997.
Brouwer, r., ADD → Address Book, 1 page, Jun. 8, 1998.
Byrne, M., ADD → New Mail, 1 page, Aug. 23, 1998.
MacCentral: Apple Macintosh News, 4 pages, Jan. 12-13, 2004.
Plaintiff's Answer to Microsoft Corporation's and Dell Inc.'s Second Amended Counterclaims, in *Arendi Holding Ltd.* v. *Microsoft Corp. and Dell Inc.*, CA No. 09-119-JJF-LPS, from United States: District Court for the District of Delaware, pp. 1-20, Dec. 14, 2009.
Johannes, S., et al., "Active Messenger: Email Filtering and Mobile Delivery," *Massachusetts Institute of Technology*, Sep. 1999, pp. 1-122.
Srihari, S, et al., "A System to Read Names and Addresses on Tax Forms," *Proceedings of the IEEE*, vol. 14, No. 7, Jul. 1996, pp. 1038-1049.
U.S. Appl. No. 12/841,302, Interview Summary, 3 pages, Dec. 20, 2010.
US Patent No. 6,323,853, U.S. Appl. No. 09/189,626 As Filed, 58 pages, Nov. 10, 1998.
US Patent No. 6,323,853, Preliminary Amendment, U.S. Appl. No. 09/189,626, 20 pages, Apr. 29, 1999.
US Patent No. 6,323,853, Office Action, U.S. Appl. No. 09/189,626, 9 pages, Apr. 26, 2000.
US Patent No. 6,323,853, U.S. Appl. No. 09/189,626, Interview Summary, 2 pages, Jun. 14, 2000.
US Patent No. 6,323,853, Response, U.S. Appl. No. 09/189,626, 5 pages, Jul. 25, 2000.

US Patent No. 6,323,853, Final Office Action, U.S. Appl. No. 09/189,626, 10 pages, Sep. 18, 2000.
US Patent No. 6,323,853, Interview Summary, U.S. Appl. No. 09/189,626, 1 page, Oct. 17, 2000.
US Patent No. 6,323,853, Response, U.S. Appl. No. 09/189,626, 5 pages, Dec. 18, 2000.
US Patent No. 6,323,853, Notice of Allowance, U.S. Appl. No. 09/189,626, 7 pages, Jan. 4, 2001.
US Patent No. 6,323,853, Notice of Allowance, U.S. Appl. No. 09/189,626, 2 pages, Oct. 2, 2001.
US Patent No. 7,496,854, Application As Filed, 100 pages, Aug. 6, 2001.
US Patent No. 7,496,854, Preliminary Amendment, U.S. Appl. No. 09/923,134, 7 pages, Dec. 17, 2001.
US Patent No. 7,496,854, Office Action, U.S. Appl. No. 09/923,134, 10 pages, Oct. 15, 2002.
US Patent No. 7,496,854, Response, 4 pages, U.S. Appl. No. 09/923,134, Apr. 15, 2003.
US Patent No. 7,496,854, Final Office Action, U.S. Appl. No. 09/923,134, 7 pages, Jun. 27, 2003.
US Patent No. 7,496,854, Response, U.S. Appl. No. 09/923,134, 6 pages, Aug. 21, 2003.
US Patent No. 7,496,854, Office Action, U.S. Appl. No. 09/923,134, 4 pages, Nov. 19, 2003.
US Patent No. 7,496,854, Response, U.S. Appl. No. 09/923,134, 5 pages, Feb. 10, 2004.
US Patent No. 7,496,854, Notice of Allowance, U.S. Appl. No. 09/923,134, 4 pages, May 19, 2004.
US Patent No. 7,496,854, Response, U.S. Appl. No. 09/923,134, 14 pages, Dec. 30, 2004.
US Patent No. 7,496,854, Office Action, U.S. Appl. No. 09/923,134, 7 pages, Aug. 29, 2005.
US Patent No. 7,496,854, Response, U.S. Appl. No. 09/923,134, 17 pages, Nov. 16, 2005.
US Patent No. 7,496,854, Final Office Action, U.S. Appl. No. 09/923,134, 10 pages, Feb. 6, 2006.
US Patent No. 7,496,854, Response, U.S. Appl. No. 09/923,134, 22 pages, Aug. 4, 2006.
US Patent No. 7,496,854, Office Action, U.S. Appl. No. 09/923,134, 8 pages, Oct. 18, 2006.
US Patent No. 7,496,854, Interview Summary, U.S. Appl. No. 09/923,134, 3 pages, Jan. 23, 2007.
US Patent No. 7,496,854, Response, U.S. Appl. No. 09/923,134, 32 pages, Apr. 18, 2007.
US Patent No. 7,496,854, Notice of Allowance, U.S. Appl. No. 09/923,134, 8 pages, Jul. 13, 2007.
US Patent No. 7,496,854, Interview Summary, U.S. Appl. No. 09/923,134, 4 pages, Oct. 19, 2007.
US Patent No. 7,496,854, Office Action, U.S. Appl. No. 09/923,134, 9 pages, Nov. 9, 2007.
US Patent No. 7,496,854, Response, U.S. Appl. No. 09/923,134, 32 pages, Jan. 24, 2008.
US Patent No. 7,496,854, Notice of Allowance, U.S. Appl. No. 09/923,134, 7 pages, Jul. 2, 2008.
US Patent No. 7,496,854, Amendment Under Rule 312; U.S. Appl. No. 09/923,134, 27 pages, Jul. 8, 2008.
US Patent No. 7,496,854, Response to Amendment Under Rule 312, U.S. Appl. No. 09/923,134, 4 pages, Jan. 21, 2009.
U.S. Appl. No. 12/182,048, Application as Filed, 47 pages, Jul. 29, 2008.
U.S. Appl. No. 12/182,048, Office Action, 34 pages, Oct. 28, 2010.
U.S. Appl. No. 12/182,048, Interview Summary, 4 pages, Dec. 1, 2010.
U.S. Appl. No. 12/182,048, Response, 36 pages, Dec. 8, 2010.
U.S. Appl. No. 12/841,302, Application As Filed, 47 pages, Jul. 22, 2010.
U.S. Appl. No. 12/841,302, Accelerated Examination Support Document, 150 pages, Jul. 22, 2010.
U.S. Appl. No. 12/841,302, Office Action, 22 pages, Nov. 24, 2010.
U.S. Appl. No. 12/841,302, Response, 18 pages, Dec. 14, 2010.
US Patent No. 7,272,604, U.S. Appl. No. 09/390,303 As Filed, 55 pages, Sep. 3, 1999.

US Patent No. 7,272,604, Office Action, U.S. Appl. No. 09/390,303, 9 pages, May 8, 2002.
US Patent No. 7,272,604, Response, U.S. Appl. No. 09/390,303, 7 pages, Aug. 8, 2002.
US Patent No. 7,272,604, Office Action, U.S. Appl. No. 09/390,303, 11 pages, Sep. 27, 2002.
US Patent No. 7,272,604, Proposed Response, U.S. Appl. No. 09/390,303, 4 pages, Oct. 24, 2002.
US Patent No. 7,272,604, Response, U.S. Appl. No. 09/390,303, 3 pages, Mar. 27, 2003.
US Patent No. 7,272,604, Final Office Action, U.S. Appl. No. 09/390,303, 9 pages, Apr. 21, 2003.
US Patent No. 7,272,604, Response, U.S. Appl. No. 09/390,303, 16 pages, Oct. 21, 2003.
US Patent No. 7,272,604, Notice of Allowance, U.S. Appl. No. 09/390,303, 7 pages, Nov. 17, 2003.
US Patent No. 7,272,604, Notice of Allowance, U.S. Appl. No. 09/390,303, 6 pages, Apr. 6, 2004.
US Patent No. 7,272,604, Supplemental Notice of Allowance, U.S. Appl. No. 09/390,303, 2 pages, Mar. 7, 2006.
US Patent No. 7,272,604, Office Action, U.S. Appl. No. 09/390,303, 10 pages, Jun. 6, 2006.
US Patent No. 7,272,604, Response, U.S. Appl. No. 09/390,303, 19 pages, Dec. 5, 2006.
US Patent No. 7,272,604, Notice of Allowance, U.S. Appl. No. 09/390,303, 7 pages, Feb. 7, 2007.
U.S. Appl. No. 12/963,744, Application As Filed, 53 pages, Dec. 9, 2010.
U.S. Appl. No. 12/963,744, Accelerated Examination Support Document, 80 pages, Dec. 9, 2010.
Person et al., "Special Edition Using Microsoft Word 97" Que Publishing, pp. 475-514, Dec. 16, 1996.
U.S. Appl. No. 12/182,048, Notice of Allowance, 53 pages, Jan. 19, 2011.
U.S. Appl. No. 12/841,302, Notice of Allowance, 31 pages, Jan. 13, 2011.
Deposition of Atle Hedloy in *Arendi Holding Ltd.* v. *Microsoft Corp*, CA No. 09-119-JJF, from United States District Court for the District of Delaware, pp. 162-213, Mar. 7, 2010.
Deposition of David Block in *Arendi Holding Ltd.* v. *Microsoft Corp*, CA No. 09-119-JJF, from United States District Court for the District of Delaware, pp. 1-67, Apr. 9, 2010.
Exhibit 15, in Deposition of David Block in *Arendi Holding Ltd.* v. *Microsoft Corp*, CA No. 09-119-JJF, from United States District Court for the District of Delaware, pp. 1-26, Apr. 9, 2010.
Exhibit 16, in Deposition of David Block in *Arendi Holding Ltd.* v. *Microsoft Corp*, CA No. 09-119-JJF, from United States District Court for the District of Delaware, pp. 1-2, Apr. 9, 2010.
Exhibit 17, in Deposition of David Block in *Arendi Holding Ltd.* v. *Microsoft Corp*, CA No. 09-119-JJF, from United States District Court for the District of Delaware, pp. 1-28, Apr. 9, 2010.
Exhibit 18, in Deposition of David Block in *Arendi Holding Ltd.* v. *Microsoft Corp*, CA No. 09-119-JJF, from United States District Court for the District of Delaware, pp. 1-23, Apr. 9, 2010.
Exhibit 19, in Deposition of David Block in *Arendi Holding Ltd.* v. *Microsoft Corp*, CA No. 09-119-JJF, from United States District Court for the District of Delaware, pp. 1-13, Apr. 9, 2010.
Deposition of James R. Miller in *Arendi Holding Ltd.* v. *Microsoft Corp*, CA No. 09-119-JJF, from United States District Court for the District of Delaware, pp. 1-115, Apr. 9, 2010.
Exhibit 11, in Deposition of James R. Miller in *Arendi Holding Ltd.* v. *Microsoft Corp*, CA No. 09-119-JJF, from United States District Court for the District of Delaware, pp. 1-7, Apr. 9, 2010.
Exhibit 12, in Deposition of James R. Miller in *Arendi Holding Ltd.* v. *Microsoft Corp*, CA No. 09-119-JJF, from United States District Court for the District of Delaware, pp. 1-2, Apr. 9, 2010.
Exhibit 13, in Deposition of James R. Miller in *Arendi Holding Ltd.* v. *Microsoft Corp*, CA No. 09-119-JJF, from United States District Court for the District of Delaware, pp. 1-28, Apr. 9, 2010.
Exhibit 14, in Deposition of James R. Miller in *Arendi Holding Ltd.* v. *Microsoft Corp*, CA No. 09-119-JJF, from United States District Court for the District of Delaware, pp. 1-18, Apr. 9, 2010.
Exhibit 15, Deposition of James R. Miller in *Arendi Holding Ltd.* v. *Microsoft Corp*, CA No. 09-119-JJF, from United States District Court for the District of Delaware, pp. 1-36, Apr. 9, 2010.
Expert Report of Bruce Croft, in *Arendi Holding Ltd.* v. *Microsoft Corp*, CA No. 09-119-JJF, from United States District Court for the District of Delaware, pp. 1-166, Apr. 30, 2010.
Exhibit a, in Expert Report of Bruce Croft, in *Arendi Holding Ltd.* v. *Microsoft Corp*, CA No. 09-119-JJF, from United States District Court for the District of Delaware, pp. 1-30, Apr. 30, 2010.
Exhibit B, in Expert Report of Bruce Croft, in *Arendi Holding Ltd.* v. *Microsoft Corp*, CA No. 09-119-JJF, from United States District Court for the District of Delaware, pp. 1-15, Apr. 30, 2010.
Exhibit C, Expert Report of Bruce Croft ,in *Arendi Holding Ltd.* v. *Microsoft Corp*, CA No. 09-119-JJF, from United States District Court for the District of Delaware, pp. 1-90, Apr. 30, 2010.
Michael Bieber "On Automating Hypertext Links in Knowledge-Based Decision Support Systems", Technical Report BCCS-90-08, pp. 1-22, Apr. 1990.
N. Streitz, A. Rizk and J. André, Hypertext: Concepts, Systems and Applications: Proceedings of the First European Conference on Hypertext, Inria, France, pp. 1-8, Nov. 1990.
Michael Bieber, "Issues in Modeling A "Dynamic" Hypertext Interface", Technical Report BCCS-91-2, pp. 1-13, Apr. 1991.
Michael Bieber and Tomás Isakowitz, "Valuation Links: Extending the Computational Power of Hypertext", Technical Report BCCS-91-1, pp. 1-11, Apr. 1991.
Michael Bieber, Template-Driven Hypertext: A Methodology for Integrating a Hypertext Interface into Information Systems, Technical Report BCCS-91-3, pp. 1-23, Jun. 1991.
Michael Bieber and Steven O. Kimbrough, "On Generalizing the Concept of Hypertext", Technical report BCCS-91-5, pp. 1-11, Jun. 1991.
Michael Bieber and Tomás Isakowitz, "Bridge Laws in Hypertext A Logic Modeling Approach", Technical Report BCCS-91-4, pp. 1-30, Jun. 1991.
Michael Bieber, "On Merging Hypertext Into Dynamic, Non-Hypertext Systems", Technical Report BCCS-91-14, pp. 1-24, Nov. 8, 1991.
Mark Bernstein, Jay David Bolter, Michael Joyce and Elli Mylonas, "Architectures for Volatile Hypertext", Hypertext '91 Proceedings, pp. 243-280, Dec. 1991.
Michael Bieber, "Providing Information Systems With Full Hypermedia Functionality", pp. 1-15, Oct. 1992.
Mail Address Change Notification, IBM Technical Disclosure Bulletin, vol. 36 No. 1, pp. 70-72, Jan. 1993.
D.D. Cowan, C.J.P. Lucena and R.G. Veitch, Towards CAAI: Computer Assisted Application Integration, Technical Report Series CS-93-17, University of Waterloo, pp. 1-23, Oct. 1993.
Herman Kaind and Stefan Kramer, Semiautomatic Generation of Dictionary Links in Hypertext, pp. 1-14, Feb. 1, 1995.
Michael Bieber, "On Integrating Hypermedia into Decision Support and Other Information Systems", Decision Support Systems 14, pp. 251-267, 1995.
Proceedings, Sixth Message Understanding Conference (MUC-6), pp. 1-64, Nov. 6-8, 1995.
Sargur N. Srihari, et al, "A System to Read Names and Addresses on Tax Forms", Proceedings of the IEEE, vol. 84, No's, Jul. 1996.
Ph. Bonnet and S. Bressan, "Extraction and Integration of Data from Semi-structured Documents into Business Applications", Sloan WP#3979, CISL WP# 97-12, pp. 1-9, Sep. 1997.
Borland, Russell, "Advance Self-Study Step by Step Microsoft Word 97 Advance Topics", Microsoft Press, 331 pages, 1997.
Microsoft Word Language Reference, Official Technical Reference to Visual Basic for Applications, Microsoft Press, 1133 pages, 1997.
Microsoft PowerPoint and Microsoft Outlook Language References, Official Technical Reference to Visual Basic for Applications, Microsoft Press, vol. 4, 539 pages, 1997.
Microsoft Visual Basic for Applications and Shared Libraries References, vol. 5 of 5, Microsoft Press, 1005 pages, part No. 097-001685, 1997.
Microsoft Office 97 Resource Kit, Technical Information and Tools for the Support Professional, Microsoft Press, 1162 pages, 1997.

Microsoft Office97 Reviewer's Guide, Professional Edition, 546 pages, Aug. 1996.
Russell Borland, Running Microsoft Word for Windows 95, In Depth Reference and Inside Tips from the Software Experts, Russell Borland, Microsoft Press, 1040 pages, 1995.
Michael Halvorson and Michael Young, Running Microsoft Office 97, Standard and Professional, Michael Halvorson and Michael Young, Microsoft Press, 1130 pages, 1997.
Microsoft Word 97, self-Study Kit, Covers Microsoft Word 97 for Windows 95 and Windows NT version 4.0, Microsoft Press, 314 pages, 1997.
Microsoft Outlook 97, Step by Step,Self-Study Kit, Microsoft Press, 359 pages, 1997.
Ken Getz and Mike Gilbert, VBA Developer's Handbook, Reusable Code, Visio Professional Demo Copy, and VB5CCE, 1997.
Microsoft97/Visual Basic Programmer's Guide, Microsoft Press, 548 pages, 1997.
Microsoft Access Language Reference and Office Data Access Reference, Official Technical Reference to Visual Basic for Applications, Microsoft Press, 1287 pages, 1997.
Davis Boctor, Microsoft Office97 Step by Step, Visual Basic, Developer's Self-Study Guide, Microsoft Press, 359 pages, 1997.
Christine Solomon, Microsoft Office97 Developer's Handbook, Microsoft Press, 596 pages, 1997.
Microsoft Word Developer's Kit, Microsoft Professional Editions, Third Edition, Manufacturing Copy $1^{st}$, Microsoft Press, 1106 pages, 1995.
Inside Microsoft Word, vol. 4, No. 1, The Cobb Group, pp. 1-16, Jan. 1997.
Inside Microsoft Word, vol. 4, No. 2, The Cobb Group, pp. 1-16, Feb. 1997.
Inside Microsoft Word, vol. 4, No. 3, The Cobb Group, pp. 1-16, Mar. 1997.
Inside Microsoft Word, vol. 4, No. 4, The Cobb Group, pp. 1-16, Apr. 1997.
Inside Microsoft Word, vol. 4, No. 7, The Cobb Group, pp. 1-16, Jul. 1997.
Inside Microsoft Word, vol. 5, No. 9, ZD Journals, pp. 1-16, Sep. 1998.
Inside Microsoft Word, vol. 5, No. 10, ZD Journals, pp. 1-16, Oct. 1998.
Inside Microsoft Word, vol. 5, No. 11, ZD Journals, pp. 1-16, Nov. 1998.
Eudora Mail Pro, Version 3.0 for Windows, User Manual, QUALCOMM Incorporated, 198 pages, Jun. 1997.
Eudora Mail Pro, Version 3.1 for Macintosh, User Manual, QUALCOMM Incorporated, 199 pages, Jun. 1997.
Non-Confidential Redacted Jun. 11, 2010 Rebuttal Expert Report Richard Taylor, 311 pages, Jun. 11, 2010.
Spell Checking for Microsoft Windows, Palantir Software, 36 pages, © 1986.
Opposition for European Patent No. EP-B-1171836, in the European Patent Office, pp. 1-2, Jul. 26, 2006.
In Response to Notice of Opposition for European Patent No. EP-B-1171836, in the European Patent Office, pp. 1-21, Mar. 7, 2007.
Brangan, James, Department 1824 Job card System: A New Web-based Business Tool, Sandia National Laboratories, 50 pages, Feb. 1998.
Fox, Heidi, et al., Learning to Extract and Classify Names from Text, IEEE International Conference on Systems, Man, and Cybernetics, vol. 2, 6 pages, Oct. 11-14, 1998.
Frank, Martin, et al., Adaptive Forms: An Interaction Technique for Entering Structured Data, University of Southern California, Information Sciences Institute, 11 pages, Sep. 30, 1998.
Novasoft Systems, Infomax Messaging System v.2.0 User's Manual, 46 pages, Jul. 1, 1996.
U.S. Appl. No. 13/041,210, Application As Filed, 52 pages, Mar. 4, 2011.
U.S. Appl. No. 12/963,744, Office Action, 14 pages, Mar. 10, 2011.
U.S. Appl. No. 12/987,840, Application As Filed, 52 pages, Jan. 10, 2011.
U.S. Appl. No. 12/987,840, Accelerated Examination Support Document, 74 pages, Jan. 10, 2011.
U.S. Appl. No. 12/987,939, Application As Filed, 52 pages, Jan. 10, 2011.
U.S. Appl. No. 12/987,939, Accelerated Examination Support Document, 72 pages, Jan. 10, 2011.
Plaintiff's Supplemental Opening Brief in Support of Its Proposed Claim Constructions, in *Arendi Holding Ltd.* v. *Microsoft Corp*, CA No. 09-119-LPS, from United States District Court for the District of Delaware, pp. 1-26, Jan. 21, 2011.
Microsoft Corporation's Supplemental Claim Construction Brief for Additional Terms to Be Construed, in *Arendi Holding Ltd.* v. *Microsoft Corp*, CA No. 09-119-LPS, from United States District Court for the District of Delaware, pp. 1-25, Jan. 21, 2011.
Plaintiff's Supplemental Answering Brief in Support of Its Proposed Claim Constructions, in *Arendi Holding Ltd.* v. *Microsoft Corp*, CA No. 09-119-LPS, from United States District Court for the District of Delaware, pp. 1-26, Feb. 4, 2011.
Microsoft Corporation's Responsive Supplemental Claim Construction Brief for Additional Terms to Be Construed, in *Arendi Holding Ltd.* v. *Microsoft Corp*, CA No. 09-119-LPS, from United States District Court for the District of Delaware, pp. 1-18, Feb. 4, 2011.
U.S. Appl. No. 12/963,744, Response, 20 pages, Apr. 11, 2011.
U.S. Appl. No. 13/111,639, Application as Filed; 48 pages, May 19, 2011.
U.S. Appl. No. 13/111,639, Accelerated Examination Support Document, 160 pages, May 19, 2011.
U. S. Appl. No. 12/963,744, Office Action, 33 pages, issued Oct. 11, 2011.
U. S. Appl. No. 12/963,744, Response C, 18 pages, filed Nov. 11, 2011.
U. S. Appl. No. 12/963,744, Supplement to Response C, 12 pages, filed Nov. 30, 2011.
U. S. Appl. No. 12/963,744, Office Action, 13 pages, issued Dec. 6, 2011.
U. S. Appl. No. 12/963,744, Request for Continued Examination and Response D, 16 pages, filed Jan. 6, 2012.
U. S. Appl. No. 12/963,744 Supplemental to Response D, 15 pages, filed Mar. 19, 2012.
U. S. Appl. No. 12/963,744 Office Action, 10 pages, issued Mar. 20, 2012.
U. S. Appl. No. 12/963,744 Response E, 11 pages, filed Mar. 26, 2012.
U. S. Appl. No. 12/987,840, Office Action, 49 pages, issued Oct. 11, 2011.
U. S. Appl. No. 12/987,840, Appeal Brief, 36 pages, filed Jan. 11, 2012.
U. S. Appl. No. 12/987,840, Response to Notice of Non-Compliant Appeal Brief, 7 pages, filed Feb. 22, 2012.
U. S. Appl. No. 12/987,840, Examiner's Answer, 19 pages, issued Mar. 9, 2012.
U. S. Appl. No. 12/987,939, Office Action, 48 pages, issued Oct. 11, 2011.
U. S. Appl. No. 12/987,939, Appeal Brief, 33 pages, filed Jan. 11, 2012.
U. S. Appl. No. 12/987,939, Examiner's Answer, 18 pages, issued Feb. 27, 2012.
U.S. Appl. No. 13/041,210, Office Action, 64 pages, issued Jan. 9, 2012.
U.S. Appl. No. 13/111,639, Office Action, 60 pages, issued Sep. 1, 2011.
U.S. Appl. No. 13/111,639, Response A, 24 pages, filed Sep. 21, 2011.
U.S. Appl. No. 13/111,639, Office Action, 36 pages, issued Nov. 10, 2011.
U.S. Appl. No. 13/111,639, Office Action, 3 pages, issued Nov. 28, 2011.
U.S. Appl. No. 13/111,639, Response B, 19 pages, filed Dec. 9, 2011.
U.S. Appl. No. 13/111,639, Advisory Action, 3 pages, issued Dec. 22, 2011.
User Manual for AddressMate and AddressMate Plus 1994-1995 by AddressMate Software.
Abowd, Gregory D., et al, "Applying Dynamic Integration as a Software infrastructure for Context-Aware Computing," GVU Technical Report, GIT-GVU-97-18 (Sep. 1997) (MS 019683-MS 019692).

Abowd, Gregory D., et al, "Context-Awareness in Wearable and Ubiquitous Computing," GVU Technical Report, GIT-GVU-97-11 (Mar. 1997) (MS 096928-MS 096936).

Apple Data Detectors User's Manual (Jul. 1, 1997) (MS 019711-MS 019726).

Apple Internet Address Data Detectors User's Manual (Aug. 28, 1997) (MS 110172-MS 110187).

Apple Introduces Internet Address Detectors (Sep. 8, 1997) (MS 049582-MS 049589).

Wood, Andrew, et al., CyberDesk: Automated Integration of Desktop and Network Services, GVU Technical Report, OIT-GVU-97-11, May 1997.

Gregory D. Abowd, Anion Dey and Andy M. Wood, Applying Dynamic Integration as a Software Infastructure for Context-Aware Computing, GVU Technical Report, GIT-GVU-97-18, Sep. 1997.

Gregory D. Abowd, Anind Dey, Robert Orr and Jason Brotherson, Context-awareness in wearable and ubiquitous computing, GVU Technical Report, GIT-GVU-97-11, Mar. 1997.

Apple Data Detectors User's Manual, Jul. 1, 1997.

Apple Internet Address Detector User's Manual, Aug. 28, 1997.

Apple Introduces Internet Address Detectors, Sep. 8, 1997.

Anind K. Dey and Gregory D. Abowd, CyberDesk: The Use of Perception in Context-Aware Computing, PUI Workshop Submission, Proc. of 1997 Workshop on Perceptual User Interfaces (PUI '97), pp. 26-27, Oct. 1997.

Anind K. Dey, Context-Aware Computing: The CyberDesk Project, Future Computing Environments, AAAI '98 Spring Symposium, Stanford Univesity, pp. 51-55, Mar. 23-25, 1998.

Anind K. Dey, Gregory D. Abowd and Andrew Wood, CyberDesk: A framework for providing self-integrating context-aware services, Knowledge-Based Systems, vol. 11, No. 1, pp. 3-13, Sep. 1998.

Anind K. Dey, Gregory D. Abowd, Mike Pinkerton and Andrew Wood, CyberDesk: A Framework for Providing Self-Integrating Ubiquitous Software Services, GVU Technical Report, GIT-GVU-97-10, May 1997.

L. Nancy Garrett, Karen E. Smith and Norman Meyrowitz, Intermedia: Issues, Strategies, and Tactics in the Design of a Hypermedia Document System, (c) 1986, pp. 163-174.

Eve Wilson, Links and Structures in hypertext databases for law, Proceedings of the First European Conference on Hypertext, INRIA, Nov. 1990.

Mike Langberg, 'Innovation is at the heart of what we do', Apple breaks new ground by displaying what's on its drawing board, Mercury News, Aug. 7, 1996, pp. 1-2.

Henry Lieberman, Bonnie A. Nardi and David Wright, Training Agents to Recognize Text by Example, Proc. of the Third Annual Conference on Autonomous Agents, Seattle, WA, pp. 116-122, 1999.

Bonnie A. Nardi, James R. Miller and David J. Wright, Collaborative, Programmable Intelligent Agents, Website, Mar. 1998, pp. 1-11.

Milind S, Pandit and Sameer Kalbag, The Selection Recognition Agent: Instance Access to Relevant Information and Operations, Proc. of Intelligent User Interfaces 1997, Orlando, FL, 1997.

Addressmate Automatic Envelope Addressing Program, User's Manual, 1991.

Peter Brown, Unix Guide, 1995.

Lee E. McMahon, SED—A Non-interactive Text Editor, Bell Laboratories, Aug. 15, 1978.

AddressMate Incorproates Correction Capability, The New York Law Publishing Company, Jan. 1996.

Lawrence J. Magid, Addressing the Matter of Labels, Los Angeles Times, Sep. 23, 1996.

Mar. 1996 Reviews, website available at www.techweb.com/winmag/library/1996/0396/03rvh002.htm.

Trial Transcript for C.A. No. 02-343T, *Arendi USA, Inc. et al.* v. *Microsoft Corporationm et al.*, Sep. 23, 2004.

Trial Transcript for C.A. No. 02-343T, *Arendi USA, Inc. et al.* v. *Microsoft Corporationm et al.*, Sep. 27, 2004.

Excerpt from Jury Charge Transcript for C.A. No. 02-343T, *Arendi USA, Inc. et al.* v. *Microsoft Corporationm et al.*, Sep. 28, 2004.

United States Court of Appeals for the Federal Circuit, Appeal From the United States District Court for the District of Rhode Island in Case No. 02-CV-343, Judge Ernest C. Torres. Brief for Defendant-Cross Apellant Frank E. Scherkenbach Jul. 7, 2005.

United States District Court for the District of Rhode Island, 02-CV-343 (ECT) Defendant Microsoft Corporation'S Motion for Judgment as a Matter of Law That the '853 Patent Is Invalid, Oct. 15, 2004.

United States District Court District of Rhode Island, CIV. A. No. 02-CV-343 (ECT), Plaintiffs' Reply Memorandum in Support of Their Motion for New Trial.Francis A. Connor. Nov. 4, 2004.

United States Court of Appeals Federal Circuit, Brief for Plaintiff-Apellant, Frank E. Scherkenbach, Sep. 2, 2005.

United States District Court for the District of Rhode Island 02-CV-343 (ECT). Memorandum in Support of Defendant Microsoft Corporation'S Opposition to Arendi'S Motion for a New Trial. Patricia A. Sullivan, Oct. 27, 2004.

United States Court of Appeals for the Federal Circuit, Appeal From the United States District Court for the District of Rhode Island in Case No. 02-CV-343, Brief of Plaintiffs-Appellants Arendi U.S.A., Inc. And Arend Holding Limited. Donald R. Dunner, Apr. 25, 2005.

United States Court of Appeals for the Federal Circuit, Appeal From the United States District Court for the District of Rhode Island in Case No. 02-CV-343, Reply Brief for Defendant-Cross Appellant. Frank E. Scherkenbach, Oct. 3, 2005.

United States District Court for the District of Rhode Island, Order Denying Defendant Microsoft Corporation'S Motion for Judgment as a Matter of Law that the '853 Patent Is Invalid, C.A. No. 02-343T. Ernest C. Torres, Chief Judge, Nov. 30, 2004.

United States District Court for the District of Rhode Island. C.A. No. 02-343T. Order Denying Plaintiffs' Motion for New Trial. Ernest C. Torres, Chief Judge, Nov. 30, 2004.

Press Release: Apple Introduces Internet Address Detectors, Sep. 8, 1997.

MacWEEK Report, Aug. 8, 1996.

Mike Langber, Show of Potential Apple Breaks New Ground by Displaying What's on Its Drawing Board 'Innovation is at the heart of what we do', in San Jose Mercury News, Aug. 7, 1996, p. 1C.

Apple Introduces Internet Address Detectors, Newsbytes, Sep. 29, 1997.

Greg Williams, Strategy Mosaic: Understanding Apple's Dual OS Strategy.

Taking [control] of your Mac with System 8, The MacAuthority, Jan. 1998.

Apple Data Detectors 1.0.2, TidBITS Updates, Mar. 8, 1998.

* cited by examiner

Arendi OneButton Contact Register

Name

- Title:
- First: John
- Middle:
- Last: Smith
- Suffix:
- Company:

- Address type: Home — 54
- Street: 222 5th Ave.
- City: New York
- State/Province: NY
- ZIP/Postal: 10028
- Country:

62

64 — Add and Choose

66 — Options....

60 — Cancel

Dette er en test

Arendi OneButton Contact Register

Existing addresses with the same name

| Name | Address type | Address | Zip | City | Country |
|---|---|---|---|---|---|
| [1]Hedløy Atle | Business | 113 Terrasse street | 12191-4292 | New York | United State of... |
| | Home | 113 113 Jacob Aall street | 12191-4292 | New York | |

Name: Atle Hedløy

Address: 113 Terrasse street
New York, NY 12191-4292
United States of America

Choose — 86
Full details... — 88
More >>> — 90
Options... — 66
Cancel — 60

Dette er en test 82, 84

Arendi OneButton Contact Register

Existing addresses with the same name

| Name | Address type | Address | Zip | City | Country |
|---|---|---|---|---|---|
| [1]Hedløy Atle | Business | 113 Terrasse street | 12191-4292 | New York | United State of... |
| | Home | 113 113 Jacob Aall street | 12191-4292 | New York | |

Name: Atle Hedløy

Address:
113 Terrasse street
New York, NY 12191-4292
United States of America

[Full details...] — 88
[Choose] — 86
[<<< Less] — 90

Name:
- Title:
- First: Atle
- Middle:
- Last: Hedløy
- Suffix:
- Company:

Address type: Home — 54
Street: 151 University Ave.
City: Palo Alto
State/Province: CA
ZIP/Postal: 94301-1632
Country: USA

[Add this address to the selected options above] — 92

64 — [Add and Choose]
66 — [Options...]

[Cancel] — 60

Dette er en test 82
84
62

METHOD, SYSTEM AND COMPUTER READABLE MEDIUM FOR ADDRESSING HANDLING FROM AN OPERATING SYSTEM

CROSS REFERENCES TO RELATED APPLICATIONS

The present application is a continuation of U.S. patent application Ser. No. 09/390,303, which was filed on Sep. 3, 1999, by Atle Hedloy, which is presently incorporated herein by reference.

The present invention is related to commonly owned U.S. patent application Ser. No. 09/189,626, incorporated herein by reference.

BACKGROUND OF THE INVENTION

1. Field of the Invention

This invention relates to a method, system and computer readable medium for name and address handling (hereinafter called "address handling"), and more particularly to a touch screen, keyboard button, icon, menu, voice command device, etc. (hereinafter called "button") provided in a computer program, such as a word processing program, spreadsheet program, etc., or operating system, such as WINDOWS™ operating system, MACINTOSH™ operating system, etc., and coupled to an information management source for providing address handling within a document created by the computer program or within the operating system.

2. Discussion of the Background

In recent years, with the advent of programs, such as word processors, spreadsheets, etc. (hereinafter called "word processors") and operating systems, such as WINDOWS™ operating system, MACINTOSH™ operating system, etc., users may require retrieval of information, such as name and address information, etc., for insertion into a document, such a letter, fax, etc., created with the word processor or for contact management at the operating system level. Typically, the information is retrieved by the user from an information management source external to the word processor, such as a database program, contact management program, etc., or from the word processor itself, for insertion into the document. Examples of such word processors are WORD™, NOTEPAD™, EXCEL™, WORDPAD™, WORDPERFECT™, QUATROPRO™, AMIPRO™, etc., and examples of such information management sources are ACCESS™, OUTLOOK™, ORACLE™, DBASE™, RBASE™, CARDFILE™, etc.

However, the information in the database must constantly be updated by the user. This requires the user to learn how to use and have access to the database. In this case, a change in the information, such as change in an address or a name, etc., requires the user of the word processor to implement this change in the database, or alternatively, the change is made to the database centrally by a database administrator.

SUMMARY OF THE INVENTION

Accordingly, an object of the present invention is to provide a method, system and computer readable medium for address handling within a computer program or operating system.

Another object of the present invention is to provide a method, system and computer readable medium for address handling within a computer program, such as a word processing program, spreadsheet program, etc, or operating system, such as such as WINDOWS™ operating system, MACINTOSH™ operating system, etc.

Another object of the present invention is to provide a method, system and computer readable medium for address handling within a computer program or operating system, using an input device provided in the computer program.

Another object of the present invention is to provide a method, system and computer readable medium for address handling within a computer program or operating system, using an input device, such as a touch screen, keyboard button, icon, menu, voice command device, etc., provided in the computer program and coupled to an information management source.

Another object of the present invention is to provide a method, system and computer readable medium for address handling within a computer program or operating system using an input device provided in the computer program or operating system and coupled to local and/or remote information management source, such as a database program, contact management program, computer network, Internet site, etc.

Another object of the present invention is to provide a method, system and computer readable medium for address handling within a computer program or operating system using an input device provided in the computer program or operating system and coupled to local and remote information management source, such as a database program, contact management program, computer network, Internet site, etc., wherein data found in the local database is related to data found in the remote database.

The above and other objects are achieved according to the present invention by providing a novel method, system and computer readable medium for information handling within an operating system, including providing a record retrieval program; providing an input device within a window or screen of the operating system and configured to enter an execute command which initiates a record retrieval from local and remote information sources using the record retrieval program; using the record retrieval program to enter first information into search fields provided in the record retrieval program; entering the execute command using the input device after the step of entering the first information; searching, using the record retrieval program, the local and remote information sources for second information associated with the first information; and displaying the second information in the record retrieval program, when one of the local and remote information sources includes second information associated with the first information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 7 is a screen shot illustrating a contact register message window, according to an exemplary embodiment of the present invention;

FIG. 10 is a screen shot illustrating a select a contact address register message window, according to an exemplary embodiment of the present invention;

FIG. 11 is a screen shot illustrating a more detailed mode of registering an additional address for the contact register of FIG. 9, according to an exemplary embodiment of the present invention;

FIG. 12 is a screen shot illustrating a contact management program window in a full detailed mode, according to an exemplary embodiment of the present invention;

DESCRIPTION OF THE PREFERRED EMBODIMENTS

Figure 1:
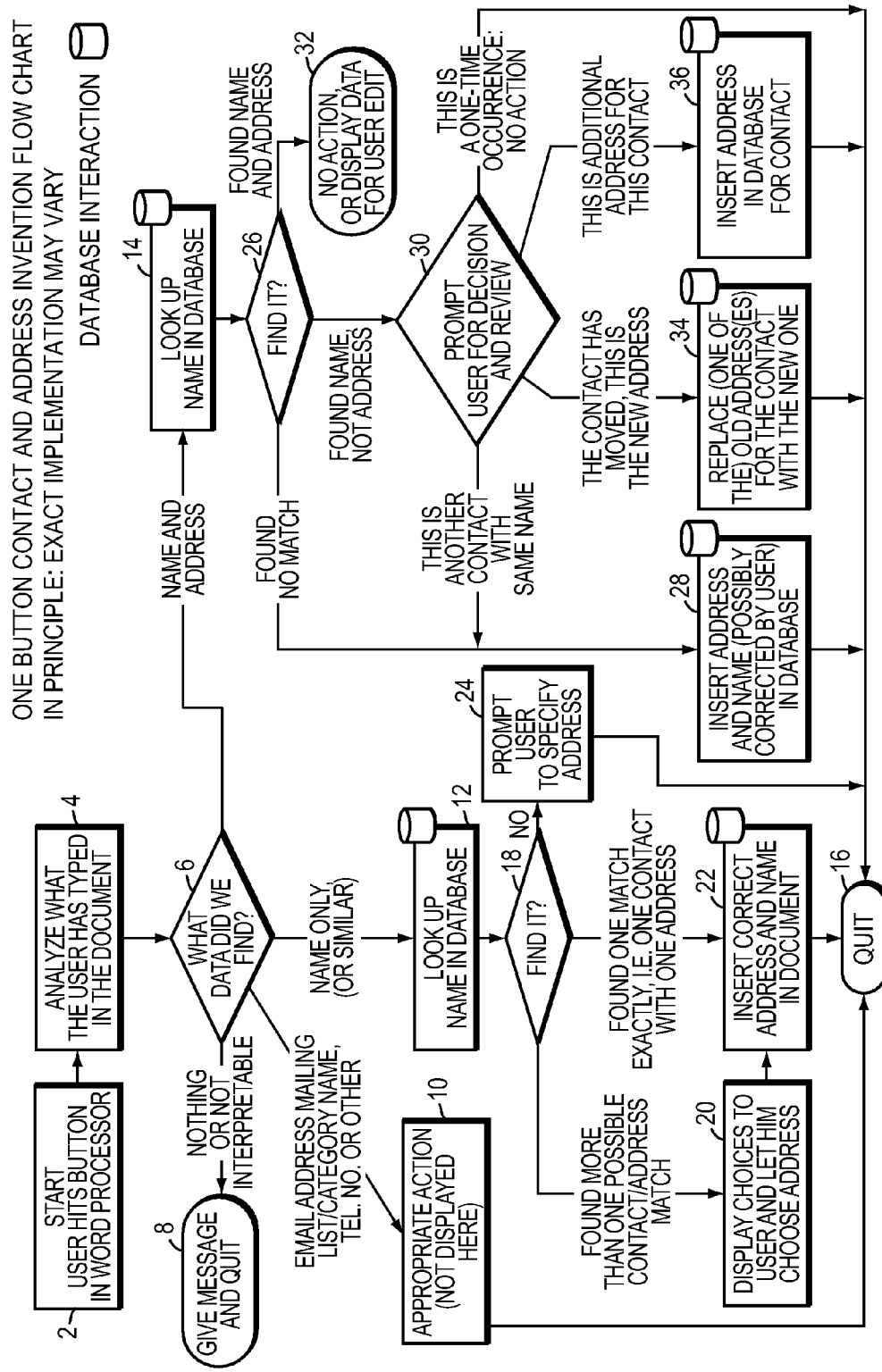
FIG. 1 is a flow chart illustrating a method for address handling within a computer program, according to an exemplary embodiment of the present invention.

In an embodiment of the present invention, single button addressing is achieved by providing an input device, such as a touch screen, keyboard, icon, menu, voice command device, etc. (hereinafter called "button"), in a computer program, such as a word processing program, spreadsheet program, etc. (hereinafter called "word processor"), or an operating system, such as WINDOWS™ operating system, MACINTOSH™ operating system, etc., for executing address handling therein.

Accordingly, in a word processor or operating system, the button is added and a user types information, such as an addressee's name, or a part of the name, etc. in a document created with the word processor, such as a letter, fax, etc., and then clicks, selects, commands, etc. the button via the appropriate input device, such as a touch screen button, keyboard button, icon, menu choice, voice command device, etc. A program then executes and retrieves the typed information from the document, and searches a local (i.e., the user's personal computer or an Intranet coupled to the user's personal computer) or remote (i.e., the Internet) information management source, such as a database, file, database program, contact management program, etc. (hereinafter called "database") to determine if the information, such as the name or part of the name typed and searched by the program exists in the database. If the program does not find stored information, such as a name, corresponding to the name or part of the name typed, the user is asked by the program whether the information, such as the name that was not found, should be added to the local database. In addition, the user may enter any other information besides the name, such as addresses, businesses, telephone numbers, fax numbers, e-mail address, etc., so that this other information can be stored in the local database for later use.

If the program finds name(s) and address(es) corresponding to the part of the addressee's name typed, this additional information is automatically entered into the user's word processor, optionally with a confirmation from the user that this is the correct data and stored in the local and/or remote database. If the typed address information does not correspond to data already stored in the local or remote database, after clicking on the button, the program, for example, lets the user decide: (1) if this is new data (e.g., a new address) for an existing contact; (2) if the stored data should be changed to what the user just typed; (3) if this is a new contact with the same name as one already entered into the database; or (4) if the typed address is only to be used once, and therefore not to be stored in the database at all. If, later, for example, a name with several address stored in the local or remote database is recalled, all addresses for this contact will be displayed, so that the correct address can be selected by the user.

The program may be extended to also store and retrieve other information, such as telephone numbers, fax numbers, e-mail addresses, etc. Once the program recalls the telephone numbers, fax numbers, e-mail addresses, etc., the user can command the program to send e-mails, faxes, etc. Similarly, if the user types in the name of a mailing list, the program create merge letters, group e-mails, etc.

Figure 2:
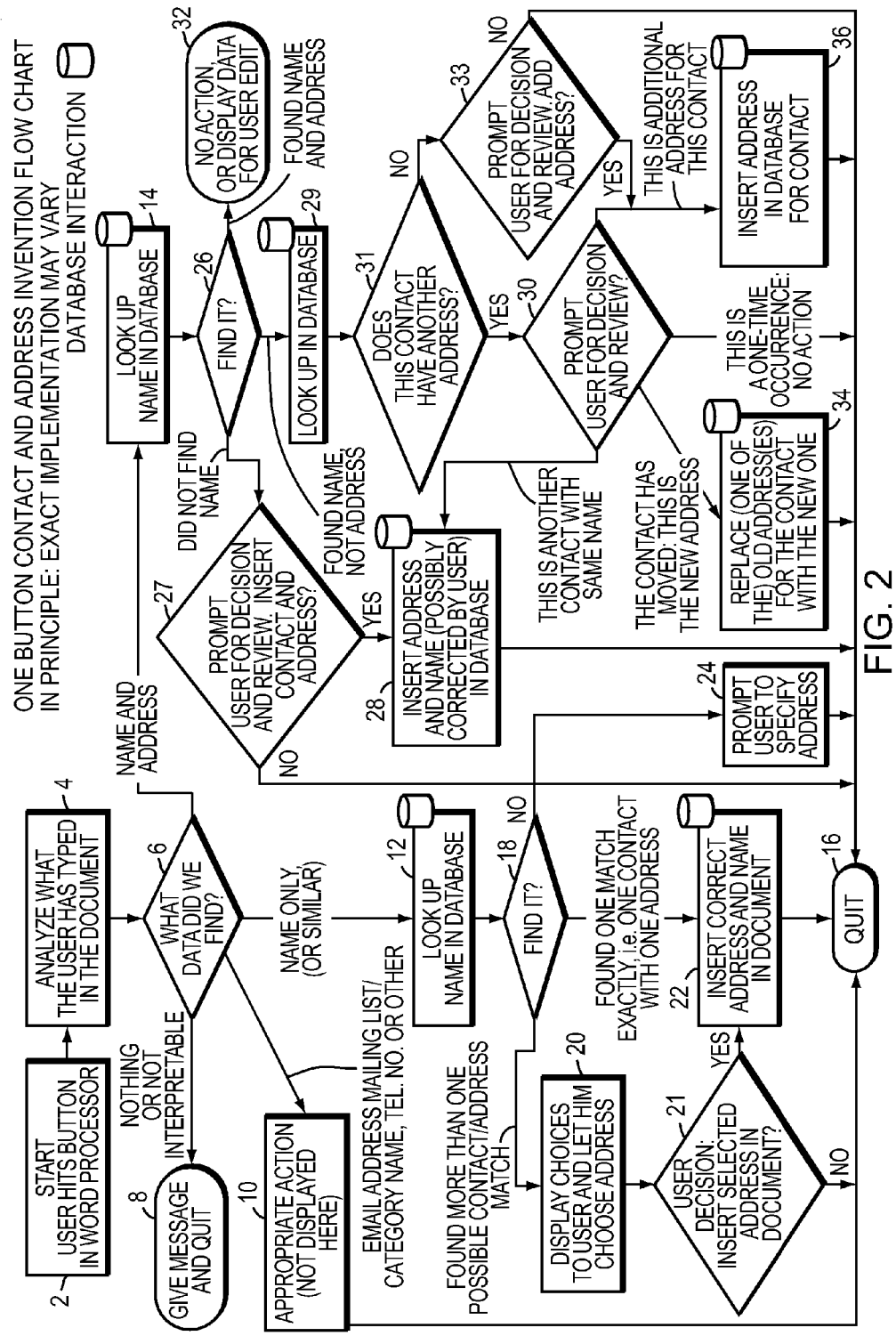
FIG. 2 is a flow chart illustrating a method for address handling within a computer program, according to another exemplary embodiment of the present invention.

Referring now to the drawings, wherein like reference numerals designate identical or corresponding parts throughout the several views, and more particularly to FIGS. 1 and 2 thereof, there is illustrated flow charts of single button addressing, according to exemplary embodiments of the present invention.

In FIG. 1, after the user has inserted the address in the word processor, the user commands the button at step 2 and the program analyzes what the user has typed in the document at step 4. At step 6, the program decides what was found in the document and if the program found nothing in the document or what it found was un-interpretable the program goes to step 8 and outputs an appropriate message to the user and then quits at step 16. The program analyzes what the user has typed in the document at step 4, for example, by analyzing (i) paragraph/line separations/formatting, etc.; (ii) street, avenue, drive, lane, boulevard, city, state, zip code, county designators and abbreviations, etc.; (iii) Mr., Mrs., Sir, Madam, Jr., Sr. designators and abbreviations, etc.; (iv) Inc., Ltd., P.C., L.L.C, designators and abbreviations, etc.; and (v) a database of common male/female names, etc.

If the program finds an e-mail address mailing list/category name telephone number or other information, at step 10 an appropriate action is performed by the program and then the program execution quits at step 16. If the program only finds a name or initials, or the like, the program looks up the name in the database at step 12 and at step 18 the program determines what was found. If the program finds more than one possible contact/address match, at step 20 the program displays menu choices to the user to let him choose an appropriate answer. Then at step 22 the program inserts a correct address and name in the document and then at step 16 the program quits execution. If the program finds one match exactly, i.e., one contact with one address, the program inserts the correct address and name in the document at step 22 and then quits execution at step 16. If the program does not find a name in the database, at step 24 the program prompts the user to specify an address and then quits execution at step 16. If the program at step 6 finds a name and an address, at step 14 the name is looked up in the database. Then, at step 26, if no match is found, at step 28 the program inserts an address and a name which are possibly corrected by the user into the database and then quits execution at step 16. If at step 26, the name and address is found, at step 32 the program either takes no action or displays the data for the user to edit. If at step 26, the name is found but not the address, the program prompts the user for a decision at step 30. If the user decides that this another contact with a same name, the program goes to step 28. If the user decides that this is a one time occurrence, no action is taken and the program quits at step 16. If the user decides that the contact has, for example, moved and that this is a new address, at step 34 one of the old addresses for the contact is replaced with the new one and the program quits at step 16. If the user decides that this is an additional address for the contact, at step 36 the additional address is inserted into the database for that contact and execution quits at step 16.

The flowchart shown in FIG. 2 is similar to the flowchart in FIG. 1, except for some additional steps which will now be discussed. At step 6, if the program only finds a name or a similar name then the name is looked up in the database at step 12, then at step 18 if the program found more than one possible contact/address match, the program displays choices to the user to let him choose an address at step 20. Then at step 21 the user decides whether to insert the selected address into the document. If the user does not decide to select the address into the document the program quits execution at step 16. If the user decides to insert the selected address into the document, the program inserts the address and name into the document at step 22 and then quits at step 16.

If the program finds a name and address in the database at step 6, then at step 14 the program looks up the name in the database and at step 26 the program determines what it has found. If the program does not find the name at step 26, at step 27 the program prompts the user for a decision and review and whether to insert the contact and address. If the user does not decide to insert the contact address, the program quits at step 16. If the user decides to insert the contact address, at step 28 the program inserts the address and name which may be possibly corrected by the user or program in the database and then execution quits at step 16.

If at step 26 the program finds a name and not an address, then at step 29 the name is looked up in the database. Then at step 31 the program decides whether this contact has another address. If the contact does not have another address, at step 33 the program prompts the user for a decision and review and whether to add the address. If the user does not want to add the address at step 33, the program quits at step 16. If the user wants to add the address at step 33 because this is an additional address for the contact, at step 36 the address is inserted in the database for the contact and execution quits at step 16.

At step 30, if the user decides that this is another contact with a same name, then the program goes to step 28. If at step 30 the user decides that this is a one time occurrence, then the program quits at step 16. If at step 30, the user decides that the contact has, for example, moved, the program goes to step 34. If at step 30, the user decides that this is an additional address for the contact, at step 36 the program inserts the address in the database for the contact and then quits at step 16.

Various exemplary screen shots which are generated during execution of the program, according to the present invention, will now be described with reference to FIGS. 3-15 and examples 1-7 as follows.

Example 1

Retrieving an Existing Address from the Database

Figure 3:
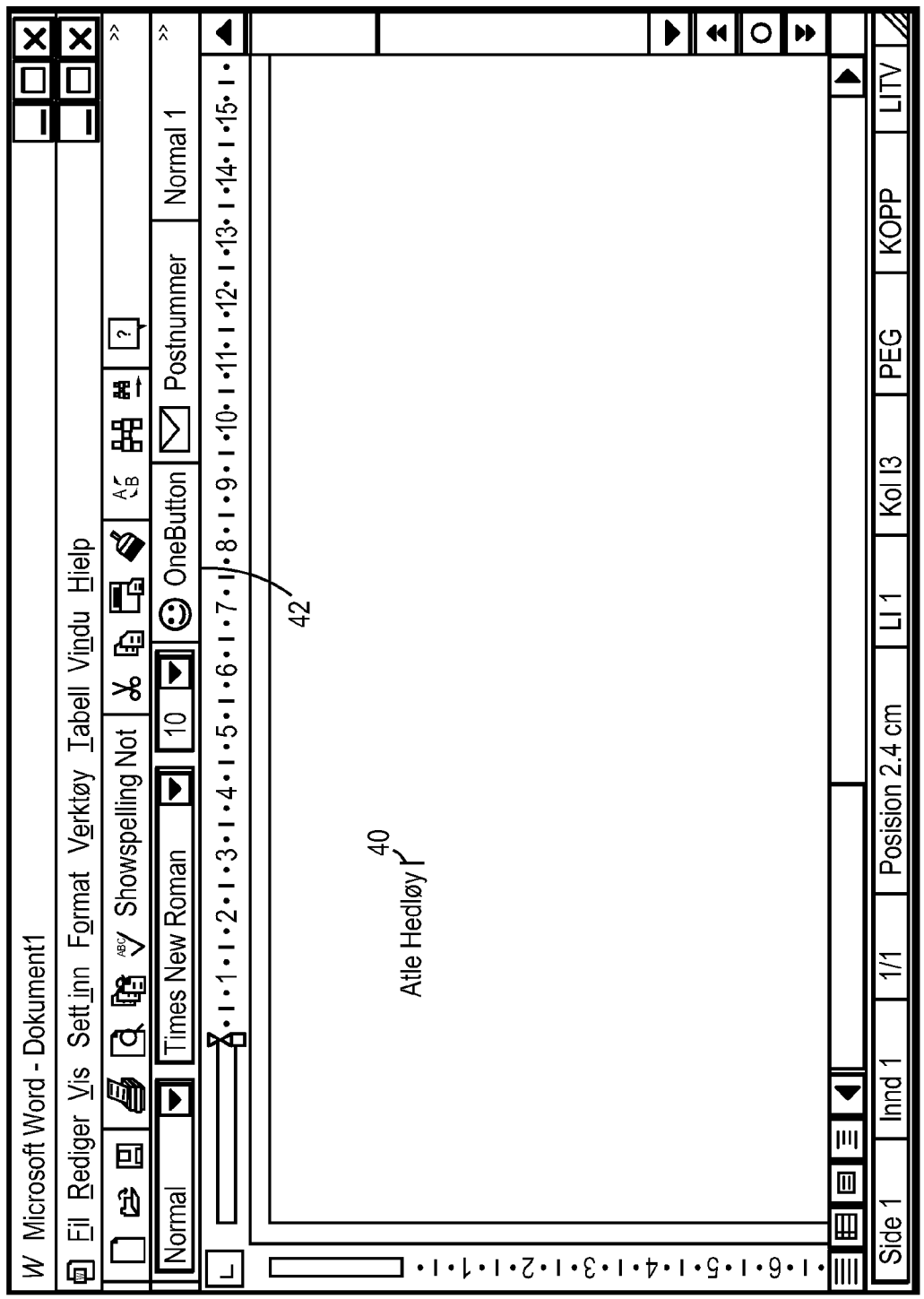
FIG. 3 is a screen shot illustrating the inputting of a name to be searched and an address handling button within a word processor, according to an exemplary embodiment of the present invention.

FIG. 3 illustrates a starting point in word processor document, such as a WORD™ document, wherein the user has typed a name 40. The user hits the button 42, for example, marked "OneButton" and the program according to the present invention retrieves the name 40 from the document, searches a database for the name 40, and inserts the retrieved address 44 associated with the name 40 into the document as shown in, for example, FIG. 4.

The above example corresponds to steps 2, 4, 6, 12, 18, 22 and 16 in the flow charts of FIGS. 1 and 2.

Example 2

Adding a New Contact to the Database

Figure 5:
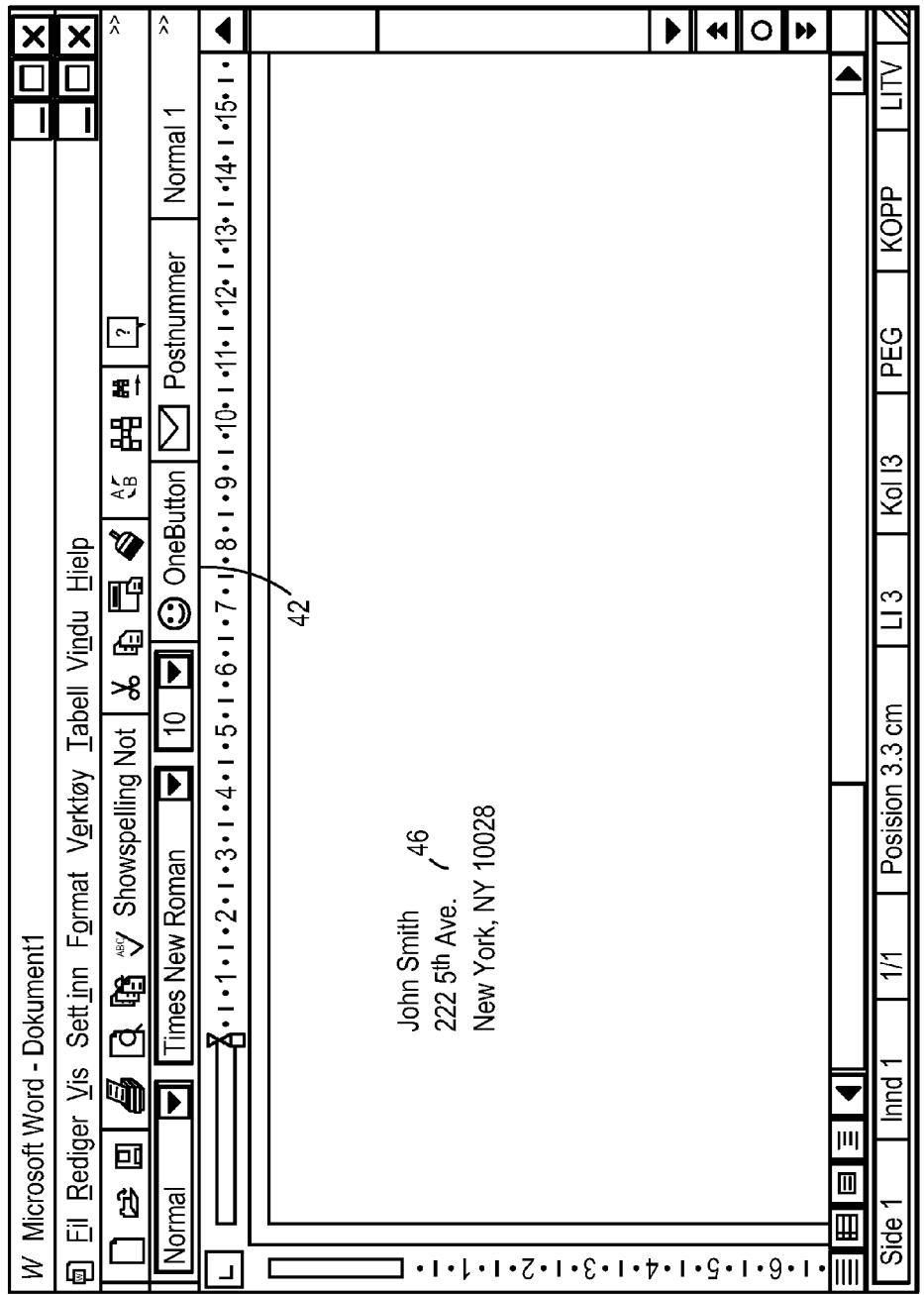
FIG. 5 is a screen shot illustrating the inputting of a name and address to be searched and an address handling button within a word processor, according to an exemplary embodiment of the present invention.
Figure 6:
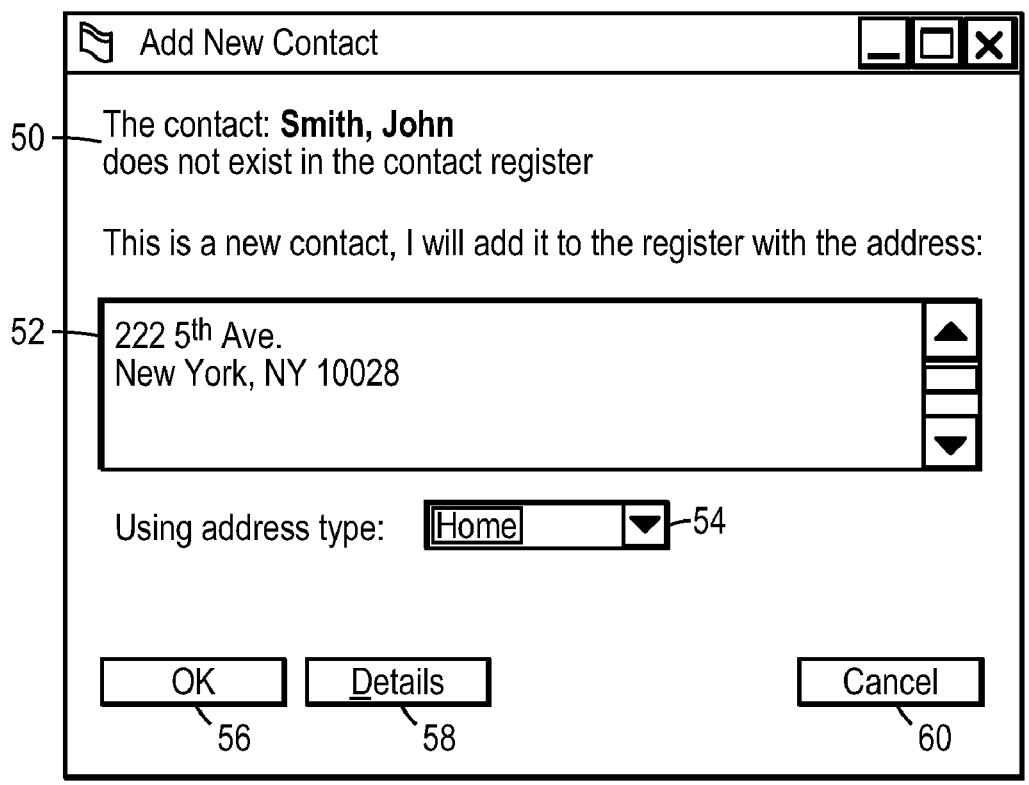
FIG. 6 is a screen shot illustrating an add new contact message window, according to an exemplary embodiment of the present invention.
Figure 8:
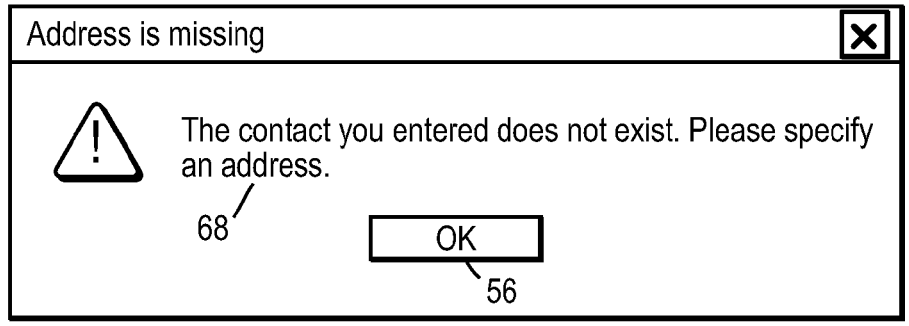
FIG. 8 is a screen shot illustrating an address missing message window, according to an exemplary embodiment of the present invention.
Figure 9:
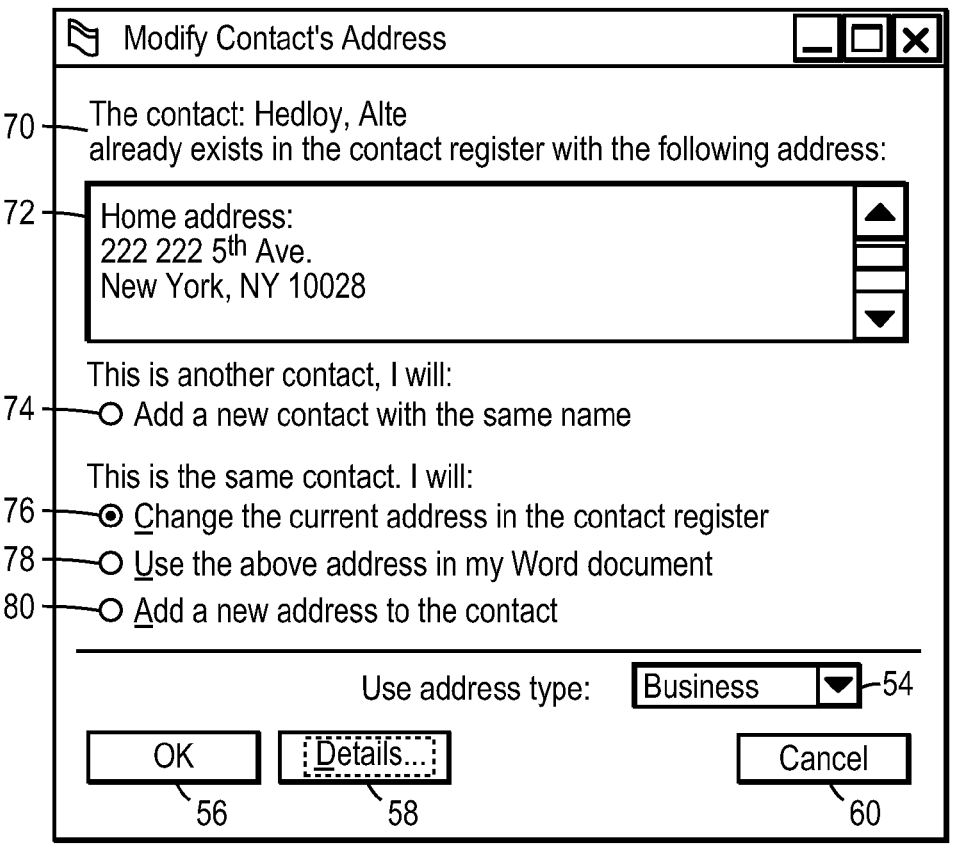
FIG. 9 is a screen shot illustrating a modify contact's address message window, according to an exemplary embodiment of the present invention.
Figure 13:
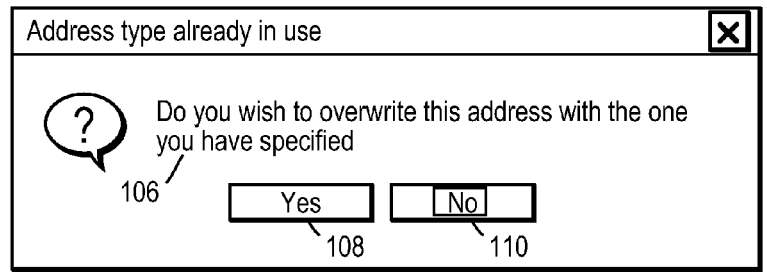
FIG. 13 is a screen shot illustrating an address already in use message window, according to an exemplary embodiment of the present invention.

FIG. 5 illustrates a starting point in word processor document, such as a WORD™ document, wherein the user has typed a name and address of a new contact 46. The user commands the button 42, for example, marked "OneButton," and the program according to the invention retrieves the new contact 46 from the document, searches a database for the name of the new contact 46 and generates a screen as shown in, for example, FIG. 6. This screen includes a message 50 informing the user that the new contact does not exist in the database, a message 52 including the address retrieved from the document, an address type selection 54, such as home, business, etc., and "OK," "Details," and "Cancel" buttons 56, 58, and 60, respectively.

At this point, the user can cancel the operation by commanding the Cancel button 60, ask the program to store data in the database and return to the document by commanding the OK button 56, or check details before storing data into the database by commanding the Details button 58. If the user commands the Details button 58, as shown in, for example, FIG. 7, a message screen is provided so that the user can review and edit data 62 and the selection 54, store the data 62 and 54 in the database by commanding a "Add and Choose" button 64, see more options by commanding an "Options" button 66, or cancel the operation by commanding the Cancel button 60.

The above example corresponds to steps 2, 4, 6, 14, 26, 28 and 16 in the flow chart of FIG. 1 and steps 2, 4, 6, 14, 26, 27, 28 and 16 in the flow chart of FIG. 2.

Example 3

Try to Retrieve Existing Address but Contact is not in Database

FIG. 3 illustrates a starting point in word processor document, such as a WORD™ document, wherein the user has typed a name of a contact 40. The user commands the button 42, for example, marked "OneButton," and the program according to the present invention retrieves the name 40 from the document, searches a database for the name of the contact 40 and generates a screen as shown in, for example, FIG. 8. This screen includes a message 68 informing the user that the contact does not exist in the database and to specify an address, and "OK" buttons 56. At this point when the user commands the OK button 56, the user returns to the document so that the contact's address can be included as in Example 2 above.

The above example corresponds to steps 2, 4, 6, 12, 18, 24 and 16 in the flow charts of FIGS. 1 and 2.

Example 4

Adding a New Address for an Existing Contact (Short Version)

Figure 4:
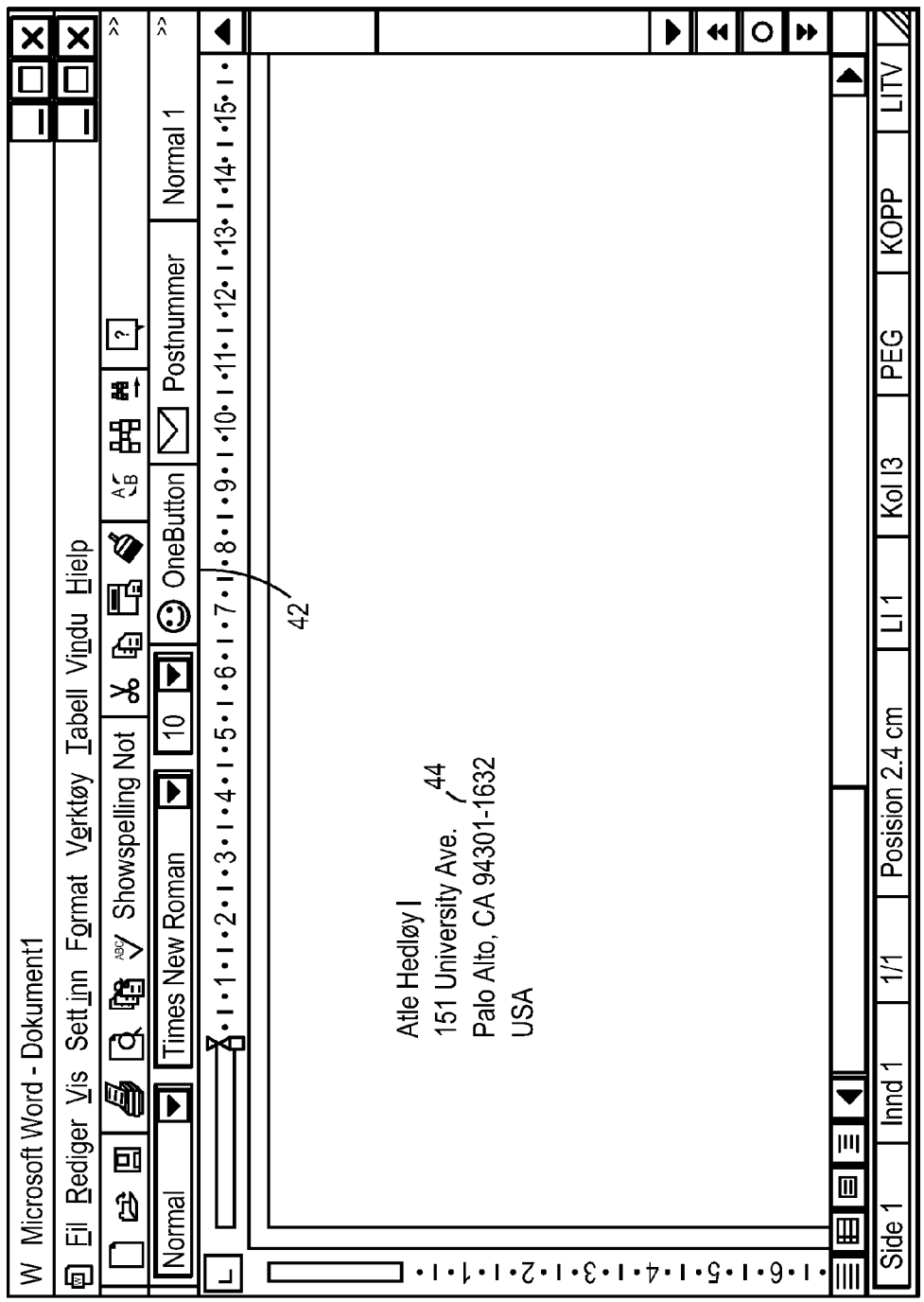
FIG. 4 is a screen shot illustrating a retrieved address in a word processor, according to an exemplary embodiment of the present invention.

FIG. 4 illustrates a starting point in word processor document, such as a WORD™ document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. This screen includes a message 70 informing the user that the contact already exits in the database with an existing address, a message 72 including the existing address, add new contact with same name selection 74, change existing address selection 76, use existing address in document selection 78, add the new address to contact selection 80, the address type selection 54, such as home, business, etc., and the "OK," "Details," and "Cancel" buttons 56, 58, and 60 respectively. At this point, the user may select one of the four options 74-80, and command the OK button 56 to execute the selected options. The user can also cancel the operation by commanding the Cancel button 60, or check details before storing data into the database by commanding the Details button 58.

The above example corresponds to steps 2, 4, 6, 14, 26, 28, 30, 34, 36, and 16 in the flow chart of FIG. 1 and steps 2, 4, 6, 14, 26, 29, 31, 30, 28, 34, 36, and 16 in the flow chart of FIG. 2.

Example 5

Selecting Between Several Possible Matching Addresses

FIG. 3 illustrates a starting point in word processor document, such as a WORD™ document, wherein the user has typed a name and possibly address of at least one existing contact 40. The user commands the button 42, for example, marked "OneButton," and the program according to the present invention retrieves the existing contact 40 from the document, searches a database for the name of the existing contact 40 and generates a screen as shown in, for example, FIG. 10. This screen includes a message informing the user that the name corresponds to several addresses and possible contacts which already exist in the database, with existing contacts and addresses for selection 82, a message 84 including the full name and address for the contact that the user selects in 82, the Options button 66, a "Choose" button 86, a "Full details" button 88, a "More>>>" button 90, and the Cancel button 60. The above screen indicates to the user that at least one contact with the same name exists, and that there are more than one addresses and/or contacts that match.

At this point, the user may command the Choose button 86 to use the selected address and return to the document, or the user may command the More>>> button 90 to view how the program interpreted what the user typed in the word processor, and possibly change this data, wherein the program generates an updated screen as shown in, for example, FIG. 11. The updated screen includes the data 62 which displays the name typed in the word processor as interpreted by the program, address fields, and the fields for the address type selection 54, such as home, business, etc., which may be changed by the user before the program stores it in the database, the Add and Choose button 64, a "<<<Less" button 90 corresponding to the More>>> button 90 for returning to the screen of FIG. 10, and an "Add this address to the selected contact above" button 92. The user might then command the Add this address to the selected contact above button 92 and the result in the word processor is illustrated in FIG. 4. The user can also cancel the operation by commanding the Cancel button 60, or command the add choose button 64 to add this name and address as a new contact and address, or open the database before storing data into the database by commanding a "Full details" button 88 as will be later described.

The above example corresponds to steps 2, 4, 6, 12, 18, 20, 22, and 16 in the flow chart of FIG. 1 and steps 2, 4, 6, 12, 18, 20, 21, 22, and 16 in the flow chart of FIG. 2.

Example 6

Adding a New Address for an Existing Contact (Long Version)

Figure 12:
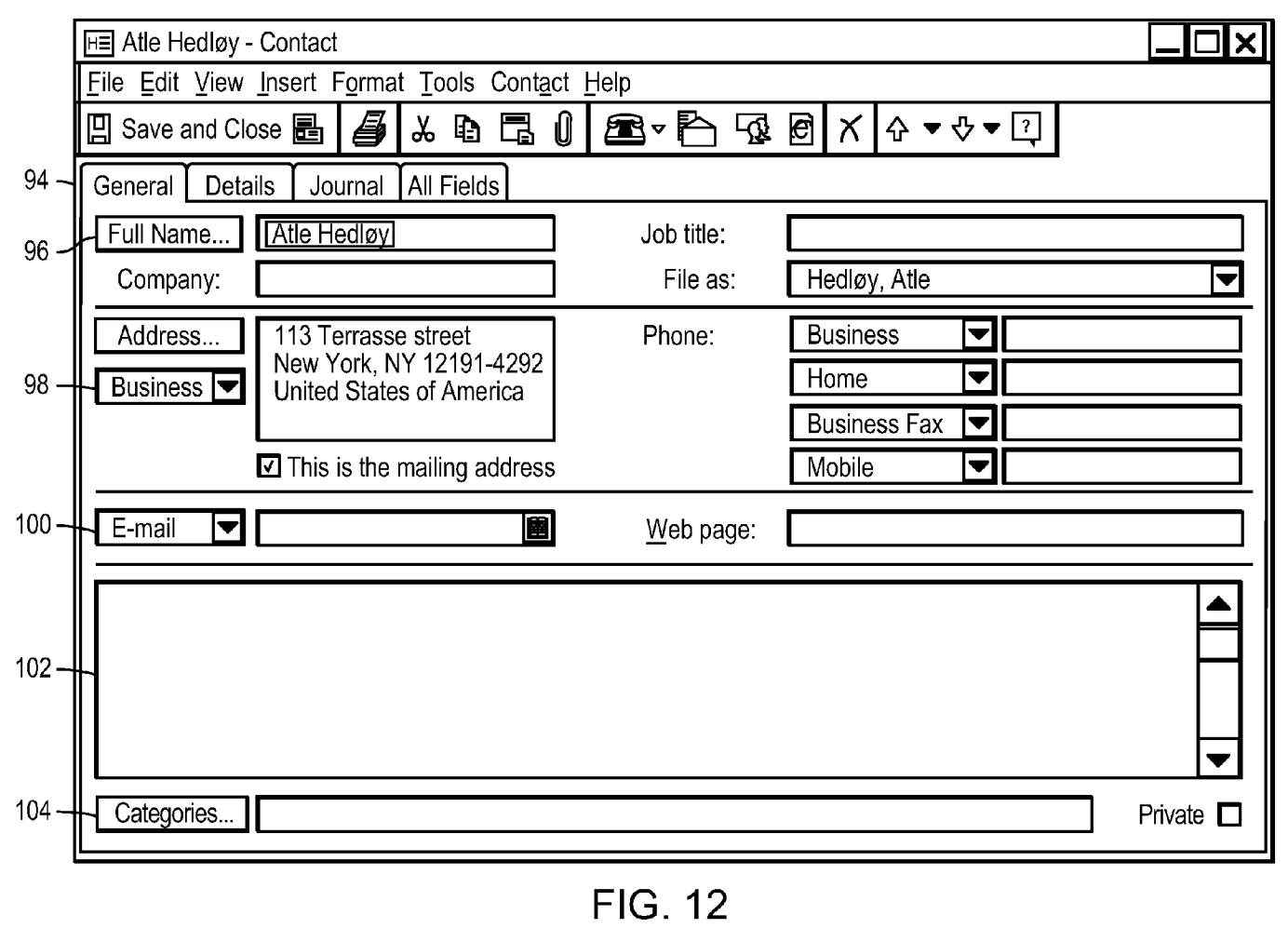

FIG. 4 illustrates a starting point in word processor document, such as a WORD™ document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. As previously described, the screen includes a message 70 informing the user that the contact already exits in the database with an existing address, and the user may command the Details button 58 to see the details of the new address for potentially modify the details before they are stored in the database and the program generates a screen as shown in, for example, FIG. 10. From this screen, the user may choose to use another address than the one he typed, and return to the document, or the user may command the "Full details" button 88 to enter a database program, such as OUTLOOK™, directly as shown in, for example, FIG. 12. In FIG. 12, the database program, such as OUTLOOK™, may include portions 94-104 for allowing the user to modify various pieces of data before they are stored in the database.

Alternatively, in the screen shown in FIG. 10, the user may command the More>>> button 90 at which time the program generates the screen as shown in, for example, FIG. 11 and as previously described. In this screen, the user might then command the Add this address to the selected contact above button 92. If the address typed is already in use, the program generates a screen including a message 106, and "Yes" and "No" buttons, 108 and 110, respectively, as shown in, for example, FIG. 13. If the user hits the Yes button 108 the program overwrites the contact address with the address specified by the user (e.g., if the contact has moved) and the result in the word processor is shown in, for example, FIG. 4.

The above example corresponds to steps 2, 4, 6, 12, 14, 26, 28, 30, 34, 36, and 16 in chart of FIG. 1 and steps 2, 4, 6, 12, 14, 26, 29, 31, 30, 28, 34, 36 and 16 in the flow chart of FIG. 2.

Example 7

Spreadsheet Application

Figure 14:
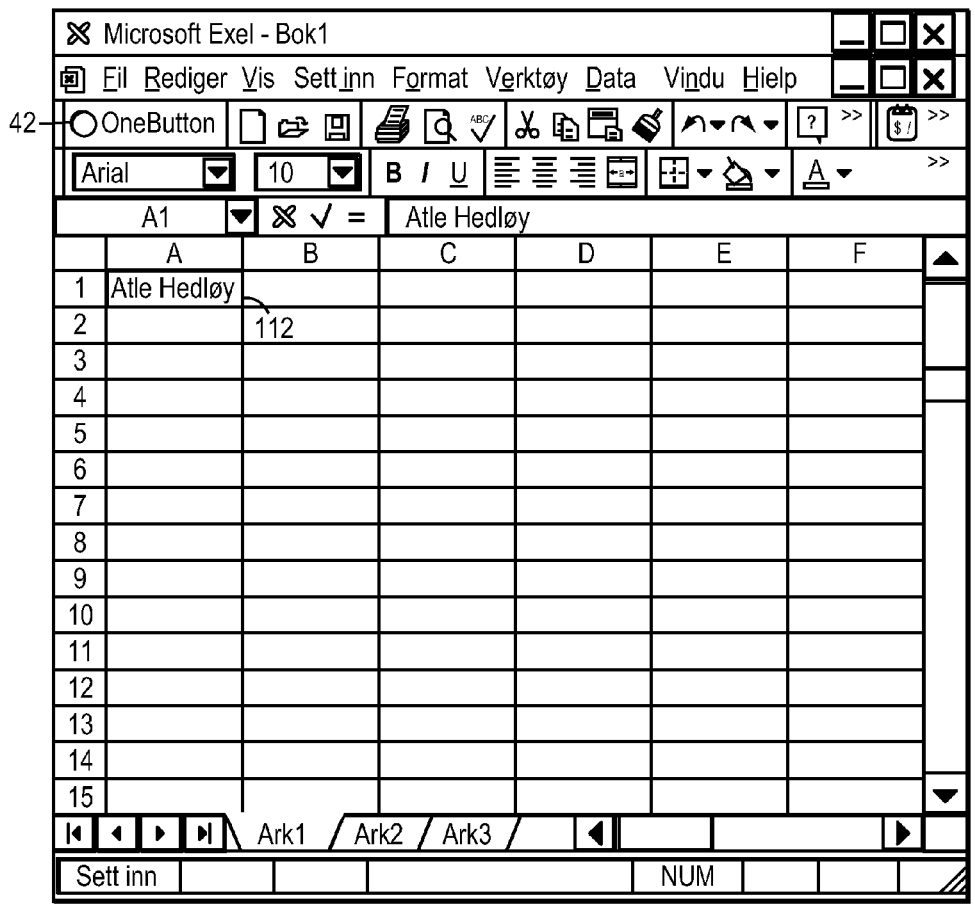
FIG. 14 is a screen shot illustrating the inputting of a name to be searched and an address handling button within a spreadsheet, according to an exemplary embodiment of the present invention.
Figure 15:
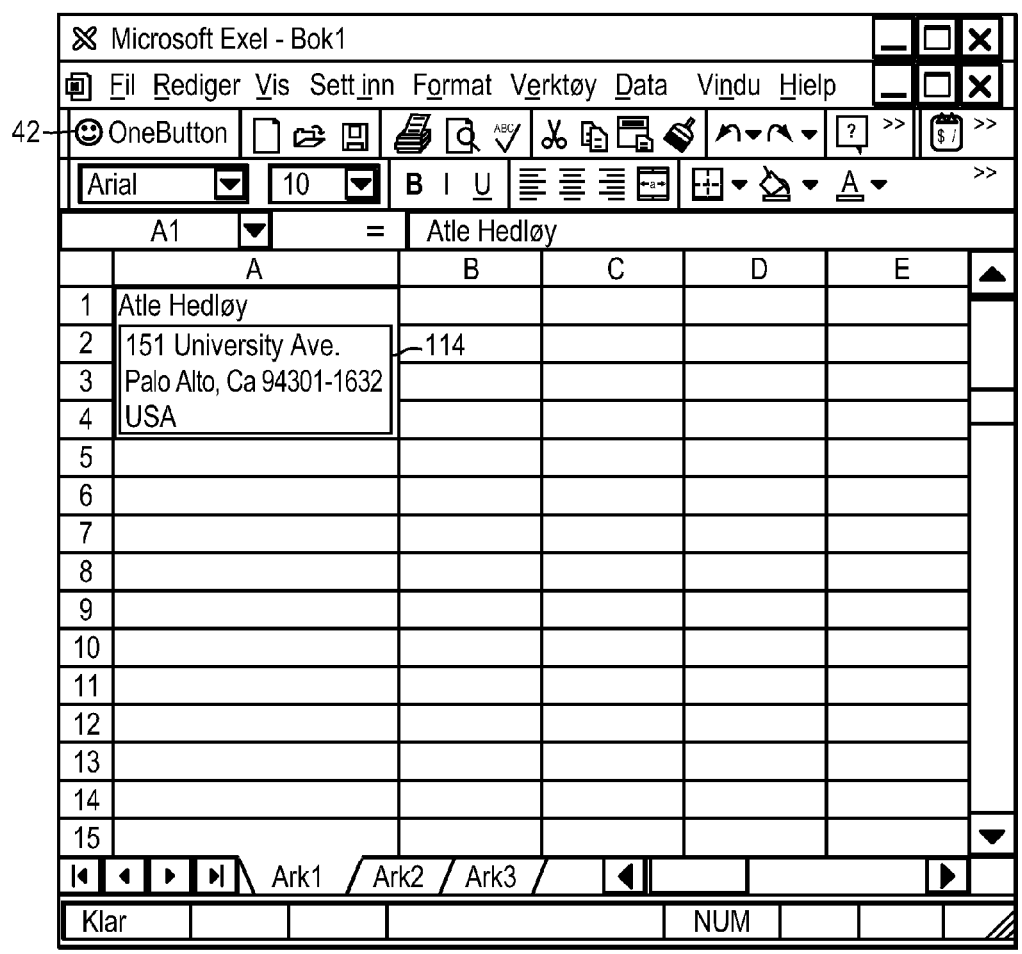
FIG. 15 is a screen shot illustrating a retrieved address in a spreadsheet, according to an exemplary embodiment of the present invention.

FIG. 14 illustrates a starting point in word processor document, such as an EXCEL™ spreadsheet, wherein the user has typed a name 112. The user hits the button 42, for example, marked "OneButton," and the program according to the present invention retrieves the name 112 from the spreadsheet, searches a database for the name 112, and inserts the retrieved address 114 into the spreadsheet as shown in, for example, FIG. 15. Accordingly, the examples 1-6 apply not only to word processor documents, such as WORD™ documents, etc., but to other word processor documents, and spread sheets, such as EXCEL™ spreadsheets, etc.

The above example corresponds to steps 2, 4, 6, 12, 18, 22 and 16 in the flow charts of FIGS. 1 and 2.

Up to this point, the single button addressing program has been described in terms of providing a device for address handling within a computer program, such as a word processor or spread sheet. The following embodiment of the single button addressing program runs on a client (e.g., a computer, cell phone, or palm top device) operating system and integrates local address and phone number data with network data, such as data obtained from an Intranet or the Internet, resolving differences and presenting them in a unified format.

The single button addressing program works within word processing, personal information management, etc., software (e.g., as previously described). The single button addressing program allows the data found on a network Intranet or Internet site to be saved in the local database and checked against network data as it changes, without the network database being aware of the local database. The network can be a public network, such as the Internet, or a private data network, such as an Intranet. The local database can be a database management system, such as Microsoft ACCESS™, Microsoft SQL server, etc., running on the local computer or any accessible server. The local database can also be an application, such as a personal information manager like Microsoft OUTLOOK™ or Symantec Act!™, etc., that maintains a database therein. Similarly, the remote database may be a public or private data service, a Web-based data source, or a CD-ROM of information used in the user's computer or computer network.

The invention according to the present embodiment performs data integration in the following way: (1) the address handling function is typically implemented as a subprogram within a larger program, such as the single button address program provided in a word processor as previously described or as single button address program provided in an operating system as will be later described; (2) the subprogram is started with a complete or partial name and address; (3) the subprogram queries the local and remote databases and compares the results; (4) the subprogram provides user interface for the user to select the appropriate result wherein the choices are marked based on whether the data is remote or local. If data was originally remote and the user saved it locally, the user is alerted if the data has changed on the remote database; (5) if the data chosen by the user is different or not present in the local database, the user is given the opportunity to save the data locally; and (6) the chosen address is returned to the calling program, which may, for example, include it in a document.

Figure 16:
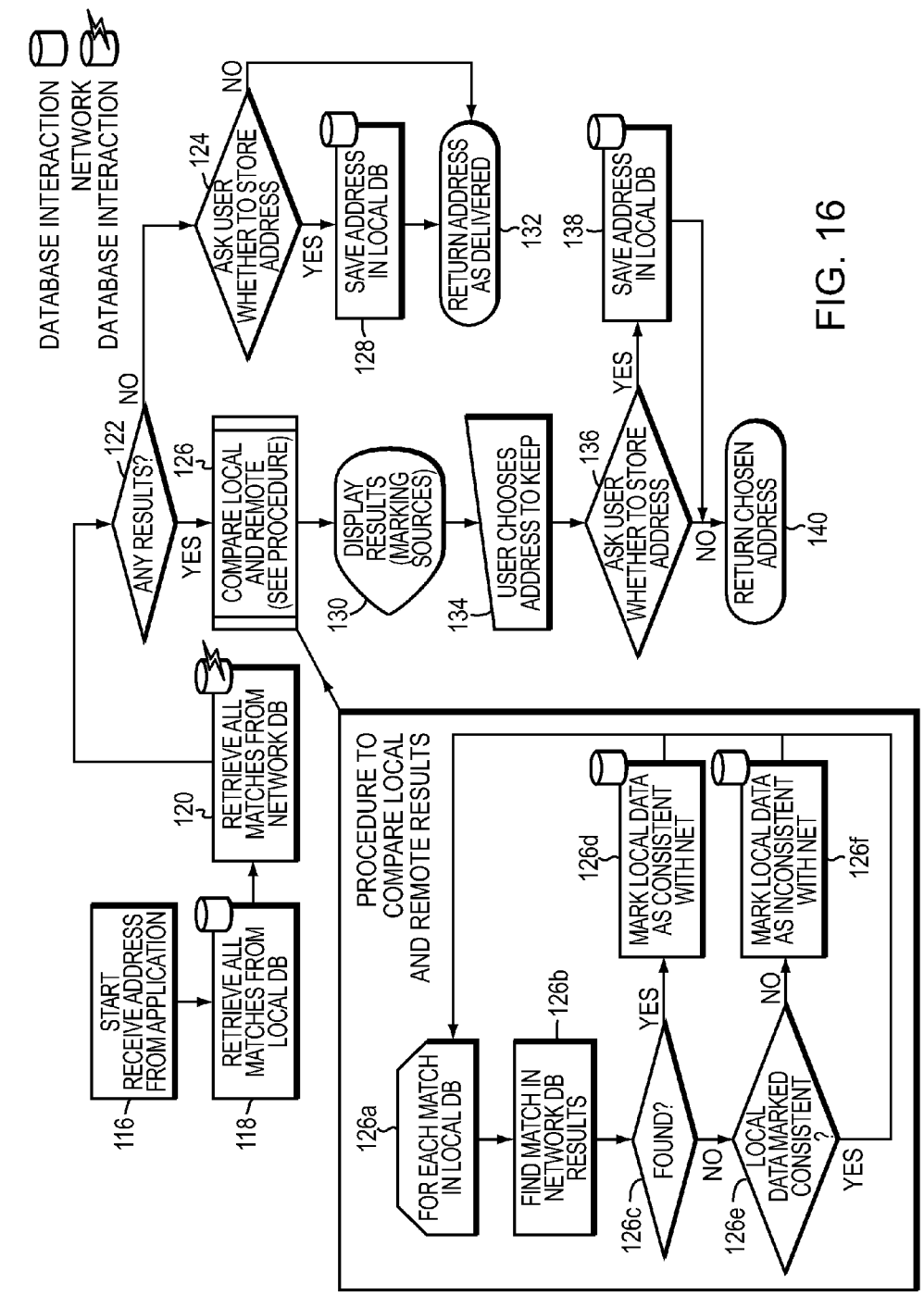
FIG. 16 is a flow chart illustrating a method for address handling within an operating system, according to another exemplary embodiment of the present invention.

FIG. 16 illustrates a method for address handling from an operating system, such as WINDOWS™ operating system, MACINTOSH™ operating system, etc., according to the present embodiment of the invention. In FIG. 16, at step 116, an address is received from an application or is entered directly into the single button addressing subprogram. At step 118, the subprogram retrieves all matches from a local database. At step 120, the subprogram retrieves all matches from a network or remote database.

At step 122, the subprogram determines whether or not there are any matching address results. If there are no matching results, the user is given the opportunity to store or not to store the address at step 124. If the user chooses to store the address, at step 128 the address is stored in the local database. If the user chooses not to store the address, at step 132 the address is returned to the calling program as delivered to the user and without being stored in the local database.

If at step 122 the subprogram determines that there are matching results, the local and remote matching database results are compared at step 126 as follows. At step 126a, for each match in the local database, step 126b determines whether or not there is a corresponding match in the remote or network database results. At step 126c, if a match is found between the local and remote databases, the matching result is marked as local data which is consistent with the network data. At step 126c, if no match is found between the local and remote databases, step 126e determines whether or no the local data was marked as consistent with the network data. If the local data was not marked as consistent with the network data, at step 126f the local data is marked as inconsistent with the network data. If the local data was marked as consistent with the network data, control transfers back to step 126a to process the next match in the local database.

Figure 17:
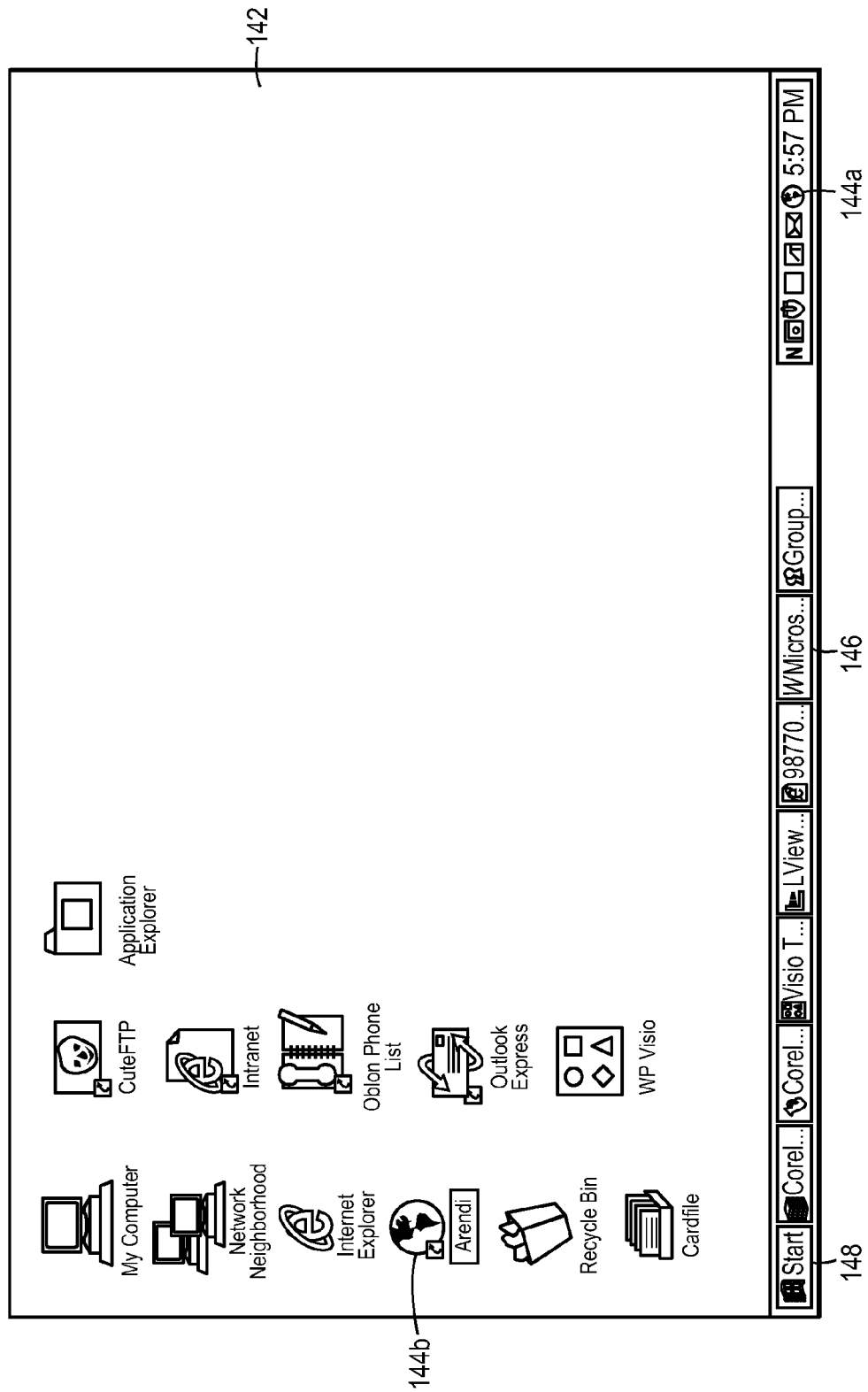
FIG. 17 is a screen shot illustrating an operating system window including means for address handling therein, according to an exemplary embodiment of the present invention.

FIG. 17, illustrates an exemplary operating system screen 142, such as a WINDOWS 95™ operating system screen, including the single button addressing subprogram implemented as tool bar subprogram 144a or as a desktop icon subprogram 144b. The single button addressing subprogram can also be launched from a word processing application 146, as previously discussed, or via the WINDOWS 95™ Start menu 148.

Figure 18:
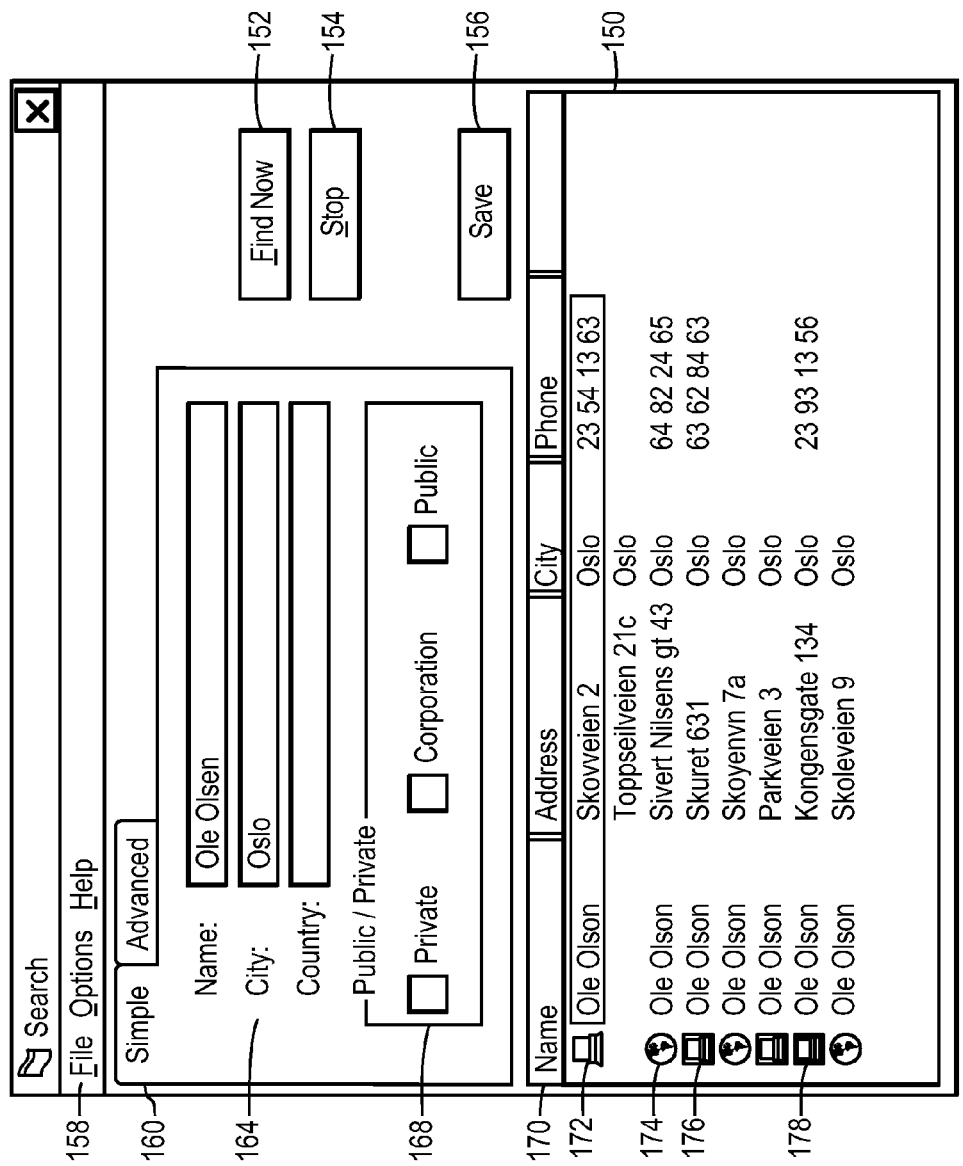
FIG. 18 is a screen shot illustrating an address handling program, according to an exemplary embodiment of the present invention.

FIG. 18 illustrates an exemplary search screen 150 generated by the single button addressing subprogram after it has been launched. In this example, a user ran a search (i.e., from the standalone single button addressing subprogram) against local data stored in, for example, Microsoft OUTLOOK™ and remote data stored in, for example, a remote web service.

In FIG. 18, the search screen 150 includes, for example, a Find Now button 152 for executing a search, a Stop button for stopping a search in progress and a Save button 156 for saving found data. The search screen 150 includes, for example, File, Option and Help menu selections 158, search criteria 164, including, for example, fields for inputting a Name, a City and/or Country, and Public/Private indicators 168, for indicating Private, Corporation and/or Public database searching options. The search results are displayed in a search window including Name, Address, City and Phone sort buttons 170, which sort the search results according to the button selected.

The search results are further marked with status indicators 172-178. Status indicator 172, for example, includes a computer icon with no color which indicates that the same data was found both locally and on the remote database (e.g., the Internet). Status indicator 174, for example, includes a globe icon which indicates that the same data was found on the remote database, but not on the local database. Status indicator 176, for example, includes a computer icon of a first color (e.g., yellow) which indicates that the same data was found on the local database, but not on the remote database. Status indicator 178, for example, includes a computer icon of a second color (e.g., red) which indicates that the data was originally added to the local database from the remote database, but now is no longer found on the remote database.

Figure 19:
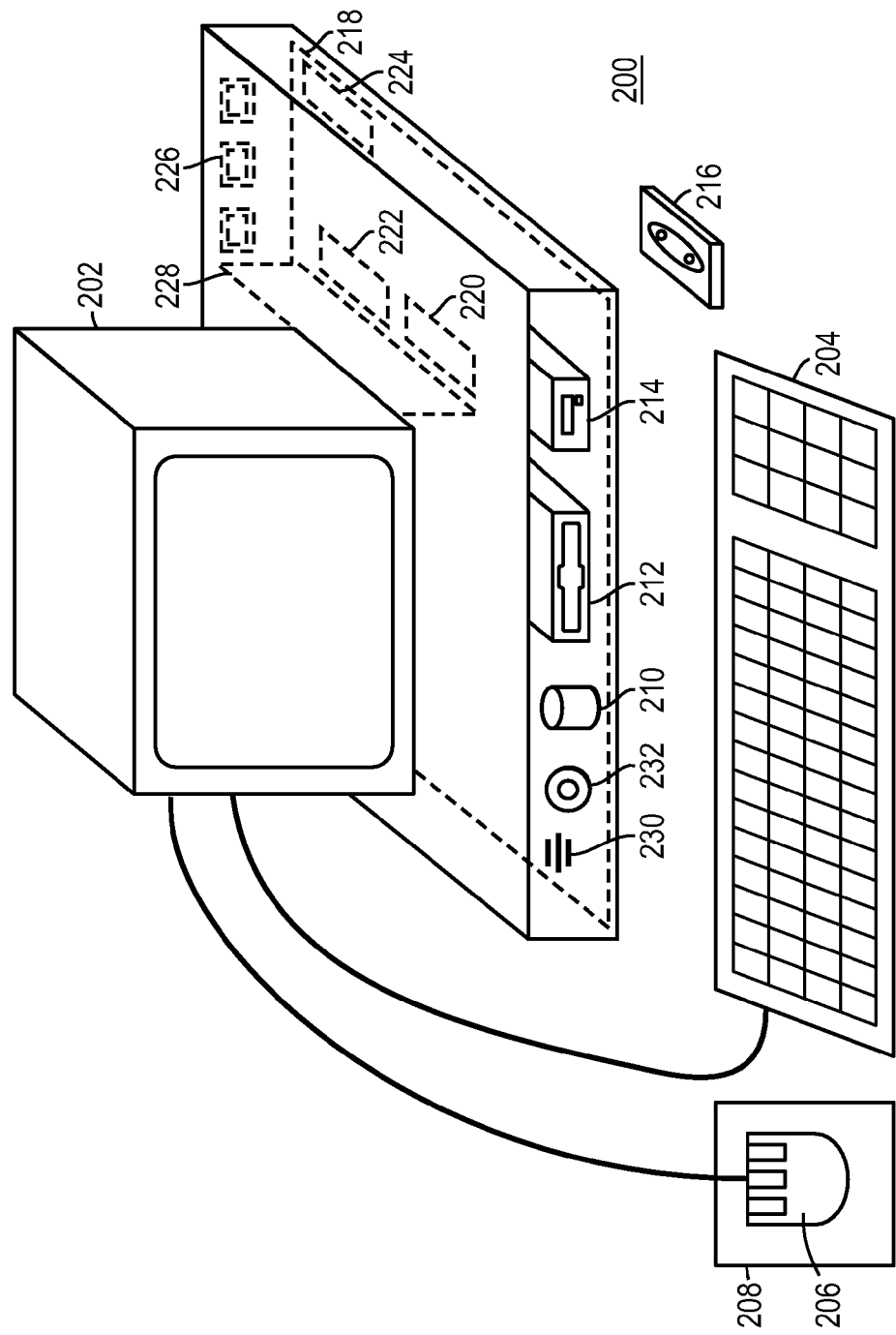
FIG. 19 is a schematic illustration of a general purpose computer for performing the processes of the present invention, according to an exemplary embodiment of the present invention.

FIG. 19 is a schematic illustration of a computer system for implementing the single button addressing according to the present invention. A computer 200 implements the method of the present invention, wherein the computer includes, for example, a display device 202, such as a conventional display device or a touch screen monitor with a touch-screen interface, etc., a keyboard 204, a pointing device 206, a mouse pad or digitizing pad 208, a hard disk 210, or other fixed, high density media drives, connected using an appropriate device bus (e.g., a SCSI bus, an Enhanced IDE bus, an Ultra DMA bus, a PCI bus, etc.), a floppy drive 212, a tape or CD ROM drive 214 with tape or CD media 216, or other removable media devices, such as magneto-optical media, etc., and a mother board 218. The mother board 218 includes, for example, a processor 220, a RAM 222, and a ROM 224 (e.g., DRAM, ROM, EPROM, EEPROM, SRAM, SDRAM, and Flash RAM, etc.), I/O ports 226 which may be used to couple to external devices, networks, etc., (not shown), and optional special purpose logic devices (e.g., ASICs) or configurable logic devices (e.g., GAL and re-programmable FPGA) 228 for performing specialized hardware/software functions, such as sound processing, image processing, signal processing, neural network processing, object character recognition (OCR) processing, etc., a microphone 230, and a speaker or speakers 232.

As stated above, the system includes at least one computer readable medium, or alternatively, the computer readable medium may be accessed through various paths, such as networks, internet, drives, etc. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 200 and for enabling the computer 200 to interact with a human user. Such software may include, but is not limited to, device drivers, operating systems and user applications, such as development tools. Such computer readable media further includes the computer program product of the present invention for performing any of the processes according to the present invention, described above (see, e.g., FIGS. 1-18). The computer code devices of the present invention can be any interpreted or executable code mechanism, including but not limited to scripts, interpreters, dynamic link libraries, Java classes, and complete executable programs, etc.

The invention may also be implemented by the preparation of application specific integrated circuits or by interconnecting an appropriate network of conventional component circuits, as will be readily apparent to those skilled in the art.

Address handling, according to this invention, is a significant simplification relative to existing methods, and requires little or no training on the part of a user, as correct addresses are retrieved with a minimal number of user commands, "clicks", keystrokes, etc. In addition, a program according to the present invention, can be programmed and created in most existing programming languages and be connected to most modern word processors. Therefore, according to the present invention, the process of creating and updating records in an address database is significantly simplified, since this may now be performed directly from the word processor.

Although the present invention is defined in terms of word processing documents, such as WORD™ documents and Excel™ spreadsheets, the present invention is applicable to all types of word processing documents, such as NOTEPAD™, WORDPAD™, WORDPERFECT™, QUATROPRO™, AMIPRO™, etc., as will be readily apparent to those skilled in the art.

Although the present invention is defined in terms of information management or database programs, such as OUTLOOK™, etc., the present invention is applicable to all types of information management or database programs, such as ACCESS™, ORACLE™, DBASE™, RBASE™, CARDFILE™, including "flat files," etc., as will be readily apparent to those skilled in the art.

Although the present invention is defined in terms of operating systems, such as WINDOWS™, MACINTOSH™, etc., the present invention is applicable to all types of operating systems, such as UNIX™, LINUX™, etc., as will be readily apparent to those skilled in the art.

Although the present invention is defined in terms of providing an input device, such as a button 42 in a word processor for address handling therein, the present invention may be practiced with all types of input devices, such as a touch screen, keyboard button, icon, menu, voice command device, etc., as will be readily apparent to those skilled in the art.

Although the present invention is defined in terms of a program retrieving information from a document before searching a database, the user may select the information in the document to be searched by the program in the database (e.g., by highlighting, selecting, italicizing, underlining, etc.), as will be readily apparent to those skilled in the art.

Although the present invention is defined in terms of a program retrieving a name or portion thereof from a document before searching a database, the program may retrieve an address or portion thereof from the document before searching the database and insert, correct, complete, etc., the retrieved address based on the information found in the database corresponding to the retrieved address or portion thereof, as will be readily apparent to those skilled in the art.

Although the present invention is defined in terms of an embodiment as described with respect to FIGS. 16-18, all of the relevant features as described with respect to FIGS. 1-15 apply to the embodiment as described with respect to FIGS. 16-18, as will be readily apparent to those skilled in the art. Similarly, although the present invention is defined in terms of an embodiment as described with respect to FIGS. 1-15, all of the relevant features as described with respect to FIGS. 16-18 apply to the embodiment as described with respect to FIGS. 1-15, as will be readily apparent to those skilled in the art.

Although the present invention is defined in terms of an address handling program provided in an operating system environment, such as WINDOWS™, MACINTOSH™, etc., of a personal computer, the program may run on an operating system environment, such as WINDOWS CE™, etc., of a client, such as cell phone, palm top device, personal organizer, etc., as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

This application claims priority and contains subject matter related to Norwegian patent application No. 984066 filed on Sep. 3, 1998, the entire contents of which are hereby incorporated by reference.

What is claimed is:

1. A computer implemented method for information handling, the method comprising:
    providing access to a contact database that can also be separately accessed and edited by a user and wherein the contact database includes at least three fields for storing contact information associated with each of one or more contacts, each of the at least three fields within the contact database being specific to a particular type of contact information selected from the group consisting of name, title, address, telephone number, and email address;
    analyzing in a computer process textual information in a document configured to be stored for later retrieval to identify a portion of the document as first contact information, without user designation of a specific part of the textual information to be subject to the analyzing, wherein the first contact information is at least one of a name, a title, an address, a telephone number, and an email address;
    after identifying the first contact information, performing at least one action from a set of potential actions, using the first contact information previously identified as a result of the analyzing, wherein the set of potential actions includes:
        (i) initiating an electronic search in the contact database for the first contact information while it is electronically displayed in order to find whether the first contact information is included in the contact database; and
        when a contact in the contact database includes the first contact information, if second contact information in the contact database is associated with that contact, electronically displaying at least a portion of the second contact information, wherein the second contact information is at least one of a name, a title, an address, a telephone number, and an email address;
        (ii) initiating electronic communication using the first contact information; and
        (iii) allowing the user to make a decision whether to store at least part of the first contact information in the contact database as a new contact or to update an existing contact in the contact database;
    wherein the computer implemented method is configured to perform each one of action (i), action (ii), and action (iii) using the first contact information previously identified as a result of the analyzing; and
    providing for the user an input device configured so that a single execute command from the input device is sufficient to cause the performing.

2. A method according to claim 1, wherein the computer implemented method is embodied in a client and the client is selected from a group consisting of a computer, a cell phone, a palm top device, and a personal organizer.

3. A method according to claim 2, wherein the first contact information is a name, the second contact information is an address, and the client is a computer.

4. A method according to claim 2, wherein the first contact information is a telephone number.

5. A method according to claim 2, wherein the first contact information is a telephone number, the second contact information is a name, and the client is a cell phone.

6. A method according to claim 1, wherein the input device is a menu and the single execute command includes the user's selection of a menu choice from the menu.

7. A method according to claim 1, wherein the input device is a button within a window.

8. A method according to claim 1, wherein when the first contact information is an e-mail address, initiating electronic communication using the first contact information comprises creating an e-mail using the e-mail address.

9. At least one non-transitory computer readable medium encoded with instructions which when loaded on at least one computer, establish processes for information handling, the processes comprising:
    providing access to a contact database that can also be separately accessed and edited by a user and wherein the contact database includes at least three fields for storing contact information associated with each of one or more contacts, each of the at least three fields within the contact database being specific to a particular type of contact information selected from the group consisting of name, title, address, telephone number, and email address;
    analyzing in a computer process textual information in a document configured to be stored for later retrieval to identify a portion of the document as first contact information, without user designation of a specific part of the textual information to be subject to the analyzing, wherein the first contact information is at least one of a name, a title, an address, a telephone number, and an email address;
    after identifying the first contact information, performing at least one action from a set of potential actions, using the first contact information previously identified as a result of the analyzing, wherein the set of potential actions includes:
        (i) initiating an electronic search the contact database for the first contact information while it is electronically displayed in order to find whether the first contact information is included in the contact database; and
        when a contact in the contact database includes the first contact information, if second contact information in the contact database is associated with that contact, electronically displaying at least a portion of the second contact information, wherein the second contact information is at least one of a name, a title, an address, a telephone number, and an email address;
        (ii) initiating electronic communication using the first contact information; and
        (iii) allowing the user to make a decision whether to store at least part of the first contact information in the contact database as a new contact or to update an existing contact in the contact database;
    wherein the computer implemented method is configured to perform each one of action (i), action (ii), and action (iii) using the first contact information previously identified as a result of the analyzing; and
    providing for the user an input device configured so that a single execute command from the input device is sufficient to cause the performing.

10. At least one non-transitory computer readable medium according to claim 9, wherein the at least one non-transitory computer readable medium is embodied in a client and the client selected from a group consisting of a computer, a cell phone, a palm top device, and a personal organizer.

11. At least one non-transitory computer readable medium according to claim 10, wherein the first contact information is a name, the second contact information is an address, and the client is a computer.

12. At least one non-transitory computer readable medium according to claim 10, wherein the first contact information is a telephone number.

13. At least one non-transitory computer readable medium according to claim 10, wherein the first contact information is a telephone number, the second contact information is a name, and the client is a cell phone.

14. At least one non-transitory computer readable medium according to claim 9, wherein the input device is a menu and the single execute command includes the user's selection of a menu choice from the menu.

15. At least one non-transitory computer readable medium according to claim 9, wherein the input device is a button within a window.

16. At least one non-transitory computer readable medium according to claim 9, wherein when the first contact information is an e-mail address, initiating electronic communication using the first contact information comprises creating an e-mail using the e-mail address.

17. An apparatus for information handling, the apparatus comprising:
   a processor; and
   a memory storing instructions executable by the processor to perform processes that include:
      providing access to a contact database that can also be separately accessed and edited by a user and wherein the contact database includes at least three fields for storing contact information associated with each of one or more contacts, each of the at least three fields within the contact database being specific to a particular type of contact information selected from the group consisting of name, title, address, telephone number, and email address;
      analyzing in a computer process textual information in a document configured to be stored for later retrieval to identify a portion of the document as first contact information, without user designation of a specific part of the textual information to be subject to the analyzing, wherein the first contact information is at least one of a name, a title, an address, a telephone number, and an email address;
   after identifying the first contact information, performing at least one action from a set of potential actions, using the first contact information previously identified as a result of the analyzing, wherein the set of potential actions includes:
      (i) initiating an electronic search in the contact database for the first contact information while it is electronically displayed in order to find whether the first contact information is included in the contact database; and
      when a contact in the contact database includes the first contact information, if second contact information in the contact database is associated with that contact, electronically displaying at least a portion of the second contact information, wherein the second contact information is at least one of a name, a title, an address, a telephone number, and an email address;
      (ii) initiating electronic communication using the first contact information; and
      (iii) allowing the user to make a decision whether to store at least part of the first contact information in the contact database as a new contact or to update an existing contact in the contact database;
   wherein the computer implemented method is configured to perform each one of action (i), action (ii), and action (iii) using the first contact information previously identified as a result of the analyzing; and
   providing for the user an input device configured so that a single execute command from the input device is sufficient to cause the performing.

18. An apparatus according to claim 17, wherein the apparatus is selected from a group consisting of a computer, a cell phone, a palm top device, and a personal organizer.

19. An apparatus according to claim 18, wherein the first contact information is a name, the second contact information is an address, and the apparatus is a computer.

20. An apparatus according to claim 18, wherein the first contact information is a telephone number.

21. An apparatus according to claim 18, wherein the first contact information is a telephone number, the second contact information is a name, and the apparatus is a cell phone.

22. An apparatus according to claim 17, wherein the input device is a menu and the single execute command includes the user's selection of a menu choice from the menu.

23. An apparatus according to claim 17, wherein the input device is a button within a window.

24. An apparatus according to claim 17, wherein when the first contact information is an e-mail address, initiating electronic communication using the first contact information comprises creating an e-mail using the e-mail address.

25. A computerized method for information handling, the method comprising:
   displaying information in a document electronically using a computer program;
   electronically analyzing the information to identify a portion of that information as contact information including at least one of a name without an address and a name with an address;
   providing an input device configured to allow a user to use the input device to command the program to perform at least one of:
      (i) inserting address information from an information source and associated with the name into the document, and
      (ii) storing at least part of the contact information in the information source;
   wherein the program is configured to perform both actions (i) and action (ii);
   during the displaying, receiving an execute command from the input device, wherein accessing and manipulating the input device are the only user actions required to cause initiation and completion of the analyzing;
   when the contact information is identified as including a name without an address, electronically searching for the name in the information source, in order to find whether the name is included in the information source; and
      when the information source includes the name, if address information in the information source is associated with the name, causing insertion of the address information into the document; and
   when the contact information is identified as including a name with an address, (a) electronically prompting the user with an option to save electronically in the information source at least some of the contact information, and (b) electronically searching for the name in the information source, in order to find whether the name is included in the information source; and when the information source includes at least one contact with the name, prompting the user to make a decision whether to store the name and address as a new contact or to update one of the at least one contact.

26. At least one non-transitory computer readable medium encoded with instructions which when loaded on at least one computer, establish processes for information handling, comprising:
  displaying information in a document electronically using a computer program;
  electronically analyzing the information to identify a portion of that information as contact information including at least one of a name without an address and a name with an address;
  providing an input device configured to allow a user to use the input device to command the program to perform at least one of:
    (i) inserting address information from an information source and associated with the name into the document, and
    (ii) storing at least part of the contact information in the information source;
  wherein the program is configured to perform both action (i) and action (ii);
  during the displaying, receiving an execute command from the input device, wherein accessing and manipulating the input device are the only user actions required to cause initiation and completion of the analyzing;
  when the contact information is identified as including a name without an address, electronically searching for the name in the information source, in order to find whether the name is included in the information source; and
    when the information source includes the name, if address information in the information source is associated with the name, causing insertion of the address information into the document; and
  when the contact information is identified as including a name with an address, (a) electronically prompting the user with an option to save electronically in the information source at least some of the contact information, and (b) electronically searching for the name in the information source, in order to find whether the name is included in the information source; and
    when the information source includes at least one contact with the name, prompting the user to make a decision whether to store the name and address as a new contact or to update one of the at least one contact.

27. A computerized method for information handling, the method comprising:
  displaying information in a document electronically using a computer program;
  electronically analyzing the information to identify a portion of that information as contact information including at least a name;
  providing an input device configured to allow a user to use the input device to command the program to perform at least one action selected from the group consisting of:
    (i) inserting address information from an information source and associated with the name into the document, and
    (ii) storing at least part of the contact information in the information source;
  wherein the program is configured to perform both action (i) and action (ii);
  during the displaying, receiving an execute command from the input device, wherein accessing and manipulating the input device are the only user actions required to cause initiation and completion of the analyzing;
  when the program performs action (i), electronically searching for the name in the information source, in order to find whether the name is included in the information source; and
    when the information source includes the name, if address information in the information source is associated with the name, causing insertion of the address information into the document; and
  when the program performs action (ii), electronically searching for the name in the information source, in order to find whether the name is included in the information source; and
    when the information source includes at least one contact with the name, prompting the user to make a decision whether to store the name as a new contact or to update one of the at least one contact.

28. A computerized method for information handling according to claim 27, further comprising:
  when the program performs action (i) and the information source includes more than one address associated with the name, prompting the user to choose one of the addresses to use for insertion into the document.

29. At least one non-transitory computer readable medium encoded with instructions which when loaded on at least one computer, establish processes for information handling, comprising:
  displaying information in a document electronically using a computer program;
  electronically analyzing the information to identify a portion of that information as contact information including at least a name;
  providing an input device configured to allow a user to use the input device to command the program to perform at least one action selected from the group consisting of:
    (i) inserting address information from an information source and associated with the name into the document, and
    (ii) storing at least part of the contact information in the information source;
  wherein the program is configured to perform both action (i) and action (ii);
  during the displaying, receiving an execute command from the input device, wherein accessing and manipulating the input device are the only user actions required to cause initiation and completion of the analyzing;
  when the program performs action (i), electronically searching for the name in the information source, in order to find whether the name is included in the information source; and
    when the information source includes the name, if address information in the information source is associated with the name, causing insertion of the address information into the document; and
  when the program performs action (ii), electronically searching for the name in the information source, in order to find whether the name is included in the information source; and
    when the information source includes at least one contact with the name, prompting the user to make a decision whether to store the name as a new contact or to update one of the at least one contact.

30. At least one non-transitory computer readable medium according to 29, wherein the instructions further establish processes wherein:

when the program performs action (i) and the information source includes more than one address associated with the name, prompting the user to choose one of the addresses to use for insertion into the document.

* * * * *